United States Patent
Ogata et al.

(10) Patent No.: US 7,904,683 B2
(45) Date of Patent: Mar. 8, 2011

(54) STORAGE SYSTEM

(75) Inventors: Ran Ogata, Odawara (JP); Junichi Muto, Odawara (JP); Kazue Jindo, Odawara (JP); Isamu Kurokawa, Odawara (JP)

(73) Assignee: Hitachi, Ltd., Tokyo (JP)

( * ) Notice: Subject to any disclaimer, the term of this patent is extended or adjusted under 35 U.S.C. 154(b) by 548 days.

(21) Appl. No.: 11/969,973

(22) Filed: Jan. 7, 2008

(65) Prior Publication Data

US 2008/0189499 A1 Aug. 7, 2008

(30) Foreign Application Priority Data

Feb. 2, 2007 (JP) ................................. 2007-023874

(51) Int. Cl.
*G06F 12/00* (2006.01)
(52) U.S. Cl. ......................................... 711/162; 711/114
(58) Field of Classification Search .................. 711/162, 711/114
See application file for complete search history.

(56) References Cited

U.S. PATENT DOCUMENTS

| | | | |
|---|---|---|---|
| 7,392,425 B1 * | 6/2008 | Schoenthal et al. | 714/7 |
| 7,421,554 B2 * | 9/2008 | Colgrove et al. | 711/162 |
| 2004/0260873 A1 * | 12/2004 | Watanabe | 711/114 |
| 2005/0257014 A1 * | 11/2005 | Maki et al. | 711/162 |
| 2006/0092828 A1 | 5/2006 | Aoki et al. | |
| 2007/0233980 A1 * | 10/2007 | Cox et al. | 711/162 |

FOREIGN PATENT DOCUMENTS

JP 2006-154880 6/2006

\* cited by examiner

*Primary Examiner* — Hashem Farrokh
(74) *Attorney, Agent, or Firm* — Antonelli, Terry, Stout & Kraus, LLP.

(57) ABSTRACT

Provided is a storage system enabling the addition of a storage apparatus without going offline. When a first storage apparatus receives from a host system a command for writing first data in any one of the primary volumes in a primary volume group, it writes the first data in the relevant primary volume and sends to a second storage apparatus a first command for writing the first data in a secondary volume specified using first mapping information. When the second storage apparatus receives from the host system a command for writing second data in any one of the secondary volume groups in a secondary volume group, it writes the second data in the relevant secondary volume and sends to the first storage apparatus a second command for writing the second data in a primary volume specified using second mapping information.

11 Claims, 25 Drawing Sheets

FIG.3

| Port# | PORT ATTRIBUTE | |
|---|---|---|
| A | Target | TA1 |
| B | Target | |
| C | INTERACTIVE COPY TARGET | |
| D | INTERACTIVE COPY INITIATOR | |

FIG.4

| Port# | PORT ATTRIBUTE | |
|---|---|---|
| E | Target | TA2 |
| F | Target | |
| G | INTERACTIVE COPY INITIATOR | |
| H | INTERACTIVE COPY TARGET | |

FIG.5

| INTER-STORAGE PHYSICAL PATH# | PHYSICAL PORT# | ADJACENT SW#/PORT# | TARGET STORAGE APPARATUS# | DESTINATION SW#/PORT# | |
|---|---|---|---|---|---|
| 1 | C | 90/C | 1 | 90/H | TB1 |
| 2 | C | 90/C | 1 | 90/G | |
| 3 | D | 90/D | 1 | 90/H | |
| 4 | D | 90/D | 1 | 90/G | |
| : | : | : | : | : | |

FIG.6

| INTER-STORAGE PHYSICAL PATH# | PHYSICAL PORT# | ADJACENT SW#/PORT# | TARGET STORAGE APPARATUS# | DESTINATION SW#/PORT# | |
|---|---|---|---|---|---|
| 1 | G | 90/G | 0 | 90/C | TB2 |
| 2 | G | 90/G | 0 | 90/D | |
| 3 | H | 90/H | 0 | 90/C | |
| 4 | H | 90/H | 0 | 90/D | |
| : | : | : | : | : | |

FIG.7

| INTER-STORAGE PHYSICAL PATH# | PHYSICAL PORT# | DESTINATION CU# |
|---|---|---|
| 1 | C | 02 |
| 1 | C | 4A |
| : | : | : |
| 2 | C | 02 |
| 2 | C | 4A |
| : | : | : |
| 3 | D | 02 |
| 3 | D | 4A |
| : | : | : |
| 4 | D | 02 |
| 4 | D | 4A |
| : | : | : |

| INTER-STORAGE PHYSICAL PATH# | PHYSICAL PORT# | DESTINATION CU# |
|---|---|---|
| 1 | G | 01 |
| 1 | G | 18 |
| : | : | : |
| 2 | G | 01 |
| 2 | G | 18 |
| : | : | : |
| 3 | H | 01 |
| 3 | H | 18 |
| : | : | : |
| 4 | H | 01 |
| 4 | H | 18 |
| : | : | : |

| SELF STORAGE CU# | SELF STORAGE DEV# | DEVGr | DEV STATUS | COPY STATUS | DESTINATION STORAGE ID# | DESTINATION SSID# | DESTINATION CU# | DESTINATION DEV# |
|---|---|---|---|---|---|---|---|---|
| 02 | 03 | PRIMARY | NORMAL | Duplex | 0 | 4E01 | 01 | 01 |
| 02 | 04 | PRIMARY | NORMAL | Duplex | 0 | 4E02 | 02 | 00 |
| .. | .. | .. | .. | .. | .. | .. | .. | .. |
| 4A | 39 | SECONDARY | NORMAL | Suspend | 0 | 4E14 | 14 | 11 |
| 58 | 21 | SECONDARY | NORMAL | Duplex | 0 | 4E29 | 29 | 17 |
| .. | .. | .. | .. | .. | .. | .. | .. | .. |

| SELF STORAGE CU# | SELF STORAGE DEV# | DEVGr | DEV STATUS | COPY STATUS | DESTINATION STORAGE ID# | DESTINATION SSID# | DESTINATION CU# | DESTINATION DEV# |
|---|---|---|---|---|---|---|---|---|
| 01 | 01 | SECONDARY | NORMAL | Duplex | 1 | 2802 | 02 | 03 |
| 02 | 00 | SECONDARY | NORMAL | Duplex | 1 | 2802 | 02 | 04 |
| .. | .. | .. | .. | .. | .. | .. | .. | .. |
| 14 | 11 | PRIMARY | BLOCKED | Suspend | 1 | 284A | 4A | 39 |
| 29 | 17 | PRIMARY | NORMAL | Duplex | 1 | 2858 | 58 | 21 |
| .. | .. | .. | .. | .. | .. | .. | .. | .. |

| DESTINATION STORAGE ID# | SW# | PORT# | SSID# | CU# | DEV# |
|---|---|---|---|---|---|
| 1 | 90 | H | 2802 | 02 | 03 |
| 1 | 90 | H | 2802 | 02 | 04 |
| 1 | 90 | H | 284A | 4A | 4A |
| 1 | 90 | G | 2858 | 02 | 02 |
| : | : | : | : | : | : |
| n | NULL | NULL | NULL | NULL | NULL |

| SELF STORAGE ID# | PRIMARY/SECONDARY APPARATUS ATTRIBUTE |
|---|---|
| 1 | SECONDARY |

~TF

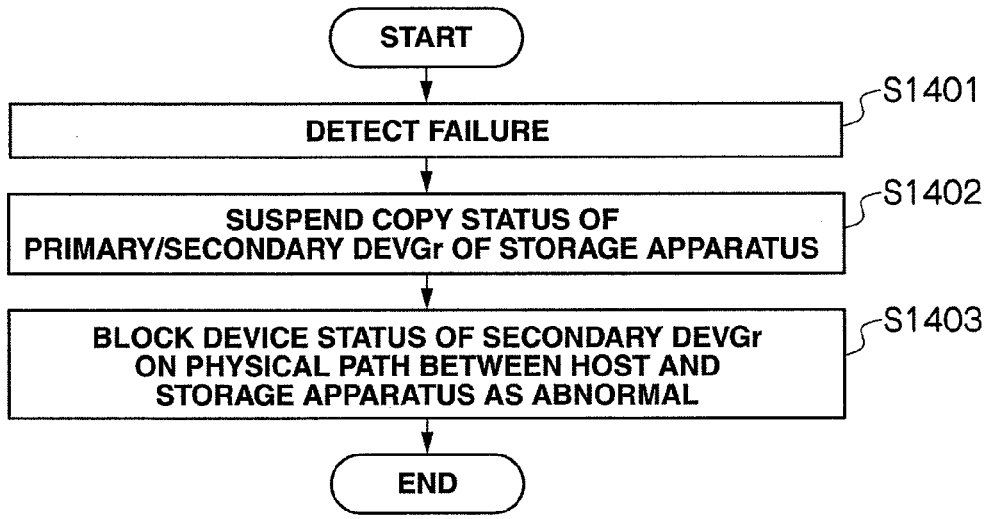
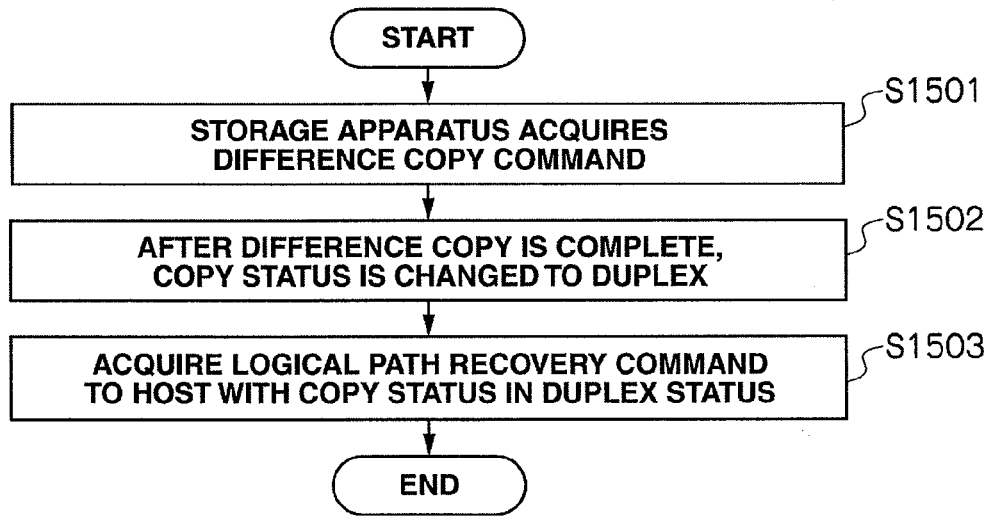
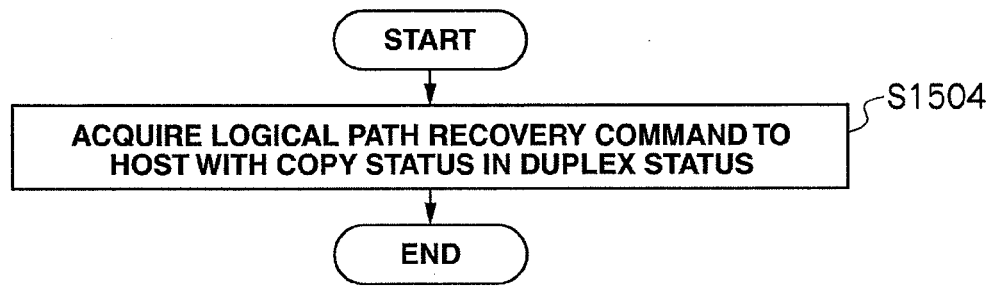

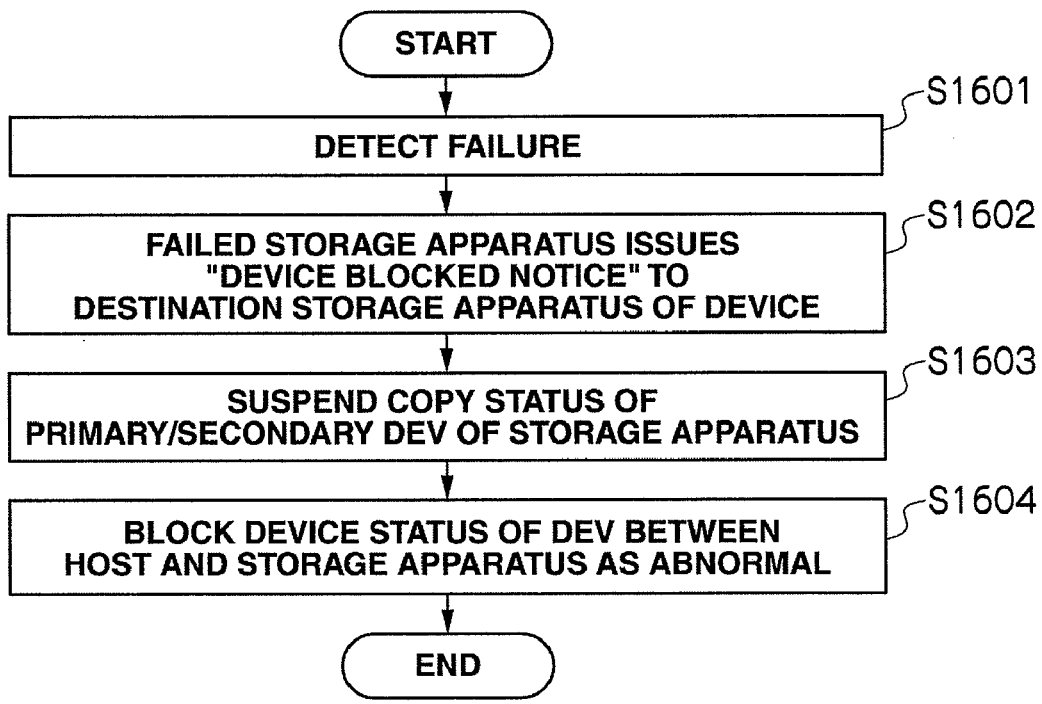
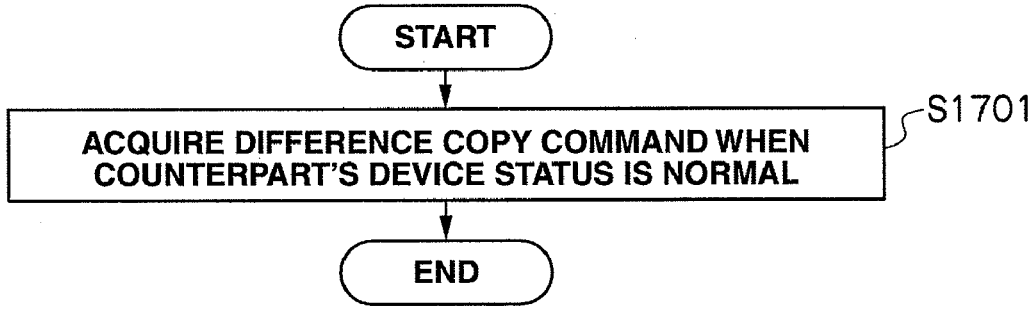

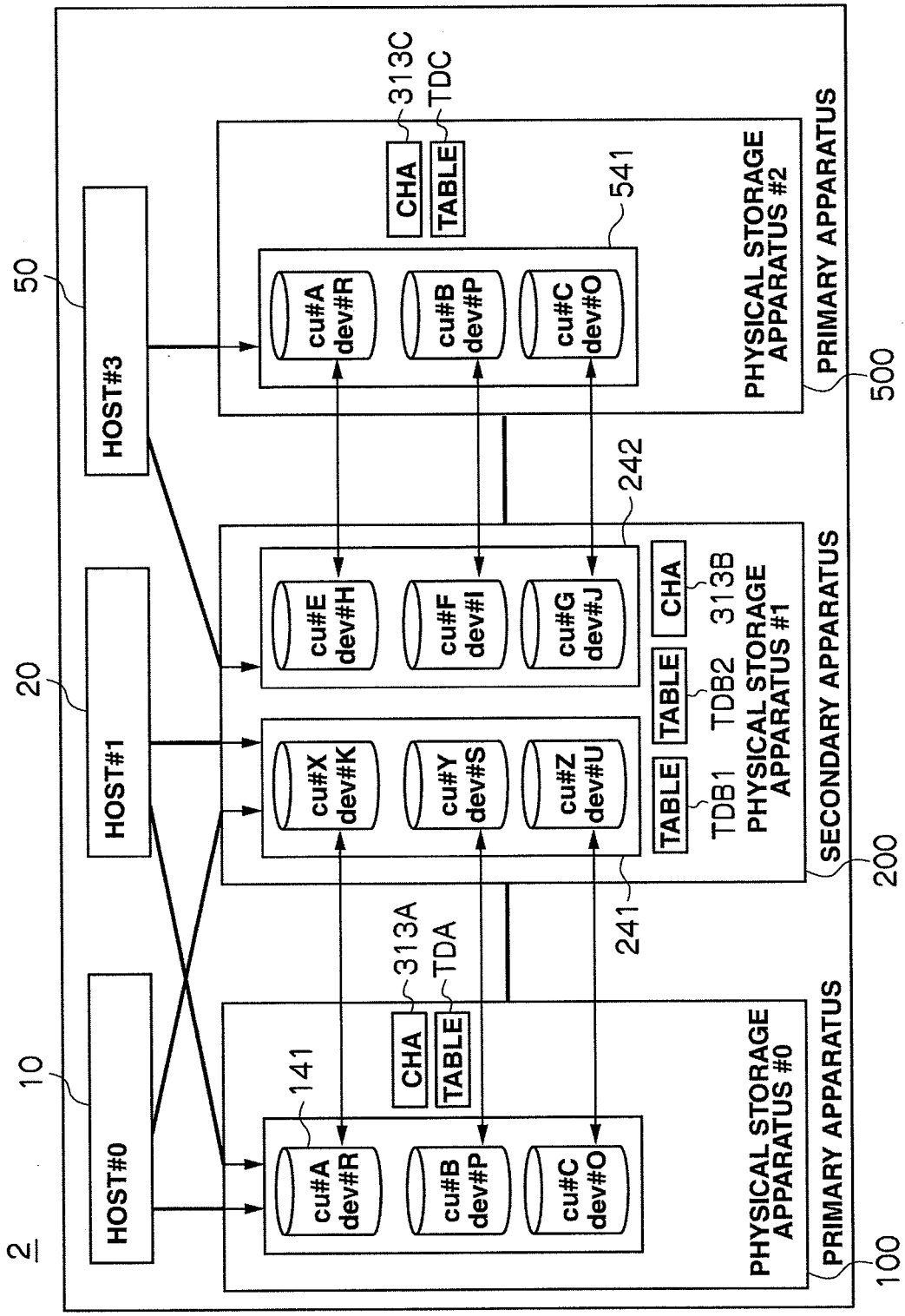

STORAGE SYSTEM

CROSS REFERENCES

This application relates to and claims priority from Japanese Patent Application No. 2007-023874, filed on Feb. 2, 2007, the entire disclosure of which is incorporated herein by reference.

BACKGROUND

The present invention generally relates to a storage system, and in particular is suitable for application in a storage system that duplicates data.

Technology for duplicating data in order to improve the reliability of data storage in a storage system is known. As data duplication technology, known is a system comprising a processor for executing an application program and an operating system, a host system for issuing an original data write/read command, a data multiplexer connected to the host system, and first and second storage systems respectively connected to the data multiplexer and which store data for the host system, wherein data is duplicated by the host system writing data in the first and second storage systems (for instance, refer to Japanese Patent Laid-Open Publication No. 2006-154880).

SUMMARY

Technology known as virtualization is sometimes used when duplicating data using the first and second storage systems. Virtualization is technology where a temporary device is set and such temporary device is recognized by a host system instead of a real device in a storage system being directly recognized by a host system. As a result, even when a physical device in a storage system is switched, the host system will not recognize the change.

Nevertheless, not all storage systems being used by users are equipped with the virtualization setting. Moreover, in order to set virtualization in an operating storage system, it is necessary to access the real device in order to set virtualization. Thus, it is necessary to make the operating storage system go offline, set virtualization, and thereafter boot the storage system once again and go online.

The present invention was devised in view of the foregoing points. Thus, an object of the present invention is to propose a storage system capable of adding a storage apparatus without going offline and duplicating data.

The storage system of the present invention includes a host system, a first storage apparatus having a primary volume group to be connected to the host system, and a second storage apparatus having a secondary volume group, and duplicates data by connecting the second storage apparatus to the host system and the first storage apparatus, and configuring a pair with the primary volume group and the secondary volume group. The first storage apparatus comprises a first mapping table for storing first mapping information which associates first information that specifies the respective primary volumes in the primary volume group and second information that specifies the respective secondary volumes in the secondary volume group, and a first control unit for writing first data in a relevant primary volume upon receiving from the host system a command for writing the first data in any one of the primary volumes in the primary volume group, and sending to the second storage apparatus a first command for writing the first data in a secondary volume corresponding to the primary volume to be written with the first data specified using the first mapping information. The second storage apparatus comprises a second mapping table for storing second mapping information associated with the same contents as the first mapping information, and a second control unit for writing second data in a relevant secondary volume upon receiving from the host system a command for writing the second data in any one of the secondary volumes in the secondary volume group, and sending to the first storage apparatus a second command for writing the second data in a primary volume corresponding to the secondary volume to be written with the second data specified using the second mapping information.

In this storage system, the first storage apparatus comprises a first mapping table for storing first mapping information which associates first information that specifies the respective primary volumes in the first primary volume group and second information that specifies the respective secondary volumes in the second secondary volume group. Upon receiving from the host system a command for writing first data in any one of the primary volumes in the first primary volume group, the first storage apparatus writes the first data in the relevant primary volume, and sends to the second storage apparatus a first command for writing the first data in a secondary volume corresponding to the primary volume to be written with the first data specified using the first mapping information. The second storage apparatus comprises a second mapping table for storing second mapping information associated with the same contents as the first mapping information. Upon receiving from the host system a command for writing second data in any one of the secondary volumes in the secondary volume group, the second storage apparatus writes the second data in the relevant secondary volume, and sends to the first storage apparatus a second command for writing the second data in a primary volume corresponding to the secondary volume to be written with the second data specified using the second mapping information. Thereby, it is possible to add a storage apparatus without going offline and duplicate date.

Further, the second storage apparatus comprises a table for storing information showing whether it is a primary apparatus or a secondary apparatus. The second control unit sends to the host system first information specifying a primary volume in the primary volume group specified with the second mapping information in substitute for second information that specifies the respective secondary volumes in the secondary volume group when a device online request is issued from the host system and information showing that it is a secondary apparatus has been set. Thereby, it is possible to make the host system recognize a volume in the primary volume group and a volume in the corresponding secondary volume group to be the same volume.

Moreover, the storage system of the present invention includes a host system, a first storage apparatus having a first primary volume group and a first secondary volume group to be connected to the host system, and a second storage apparatus having a second primary volume group and a second secondary volume group, and duplicates data by connecting the second storage apparatus to the host system and the first storage apparatus, configuring a first pair with the first primary volume and the second secondary volume group, and configuring a second pair with the second primary volume group and the first secondary volume group. The first storage apparatus comprises a first mapping table for storing first mapping information which associates first information that specifies the respective primary volumes in the first primary volume group and second information that specifies the respective secondary volumes in the second secondary volume group, and a first control unit for writing first data in a relevant primary volume upon receiving from the host system a command for writing the first data in any one of the primary volumes in the first primary volume group, and sending to the second storage apparatus a first command for writing the first data in a secondary volume corresponding to the primary volume to be written with the first data specified using the first mapping information, and for writing second data in a relevant secondary volume upon receiving from the host system a command for writing the second data in a secondary volume in the first secondary volume group, and sending to the second storage apparatus a second command for writing the second data in a primary volume corresponding to the secondary volume to be written with the second data specified using the first mapping information. The second storage apparatus comprises a second mapping table for storing second mapping information associated with the same contents as the first mapping information, and a second control unit for writing third data in a relevant primary volume upon receiving from the host system a command for writing the third data in any one of the primary volumes in the second primary volume group, and sending to the first storage apparatus a third command for writing the third data in a second volume corresponding to the primary volume to be written with the third data specified using the second mapping information, and for writing fourth data in a relevant secondary volume upon receiving from the host system a command for writing the fourth data in a secondary volume in the second secondary volume group, and sending to the first storage apparatus a fourth command for writing the fourth data in a primary volume corresponding to the secondary volume to be written with the fourth data specified using the second mapping information.

In this storage system, the first storage apparatus comprises a first mapping table for storing first mapping information which associates first information that specifies the respective primary volumes in the first primary volume group and second information that specifies the respective secondary volumes in the second secondary volume group. The first storage apparatus writes first data in a relevant primary volume upon receiving from the host system a command for writing the first data in any one of the primary volumes in the first primary volume group, and sends to the second storage apparatus a first command for writing the first data in a secondary volume corresponding to the primary volume to be written with the first data specified using the first mapping information, and writes second data in a relevant secondary volume upon receiving from the host system a command for writing the second data in a secondary volume in the first secondary volume group, and sends to the second storage apparatus a second command for writing the second data in a primary volume corresponding to the secondary volume to be written with the second data specified using the first mapping information. The second storage apparatus comprises a second mapping table for storing second mapping information associated with the same contents as the first mapping information. The second storage apparatus writes third data in a relevant primary volume upon receiving from the host system a command for writing the third data in any one of the primary volumes in the second primary volume group, and sends to the first storage apparatus a third command for writing the third data in a second volume corresponding to the primary volume to be written with the third data specified using the second mapping information, and writes fourth data in a relevant secondary volume upon receiving from the host system a command for writing the fourth data in a secondary volume in the second secondary volume group, and sends to the first storage apparatus a fourth command for writing the fourth data in a primary volume corresponding to the secondary volume to be written with the fourth data specified using the second mapping information. Thereby, it is possible to add a storage apparatus without going offline and duplicate data, and distribute the access from the first host system to the first storage apparatus or the second storage apparatus in order to improve the processing performance.

Incidentally, the first mapping information contains first volume group information showing whether it is a primary volume group or a secondary volume group, first status information showing a status on whether or not a volume is of a normal status, and first copy status information showing a status on whether or not a volume is of a copy status. The second mapping information contains second volume group information showing whether it is a primary volume group or a secondary volume group, second status information showing a status on whether or not a volume is of a normal status, and second copy status information showing a status on whether or not a volume is of a copy status.

Further, storage system of the present invention includes a first host system, a first storage apparatus having a first primary volume group to be connected to the first host system, a second storage apparatus having a first secondary volume group and a second secondary volume group, a second host system, and a second primary volume group to be connected to the second host system, and duplicates respective data by connecting the second storage apparatus to the first host system, the first storage apparatus, the second host system and the third storage apparatus, configuring a pair with the first primary volume group of the first storage apparatus and the first secondary volume group, and configuring a pair with the second primary volume group of the third storage apparatus and the second secondary volume group. The first storage apparatus comprises a first mapping table for storing first mapping information which associates first information that specifies the respective primary volumes in the first primary volume group and second information that specifies the respective secondary volumes in the first secondary volume group, and a first control unit for writing first data in a relevant primary volume upon receiving from the first host system a command for writing the first data in any one of the primary volumes in the first primary volume group, and sending to the second storage apparatus a first command for writing the first data in a secondary volume corresponding to the primary volume to be written with the first data specified using the first mapping information, a second mapping table for storing second mapping information which associates third information that specifies the respective primary volumes in the second primary volume group and fourth information that specifies the respective volumes in the second secondary volume group, and a second control unit for writing second data in a relevant primary volume upon receiving from the second host system a command for writing the second data in any one of the primary volumes in the second primary volume group, and sending to the second storage apparatus a second command for writing the second data in a secondary volume corresponding to the primary volume to be written with the second data specified using the second mapping information. The second storage apparatus comprises a third mapping table for storing third mapping information associated with the same contents as the first mapping information, a fourth mapping table for storing fourth mapping information associated with the same contents as the second mapping information, and a third control unit for writing third data in a relevant secondary volume upon receiving from the first host system a command for writing the third data in any one of the secondary volumes in the first secondary volume group, and sending to the first storage apparatus a third command for writing the third data in a primary volume corresponding to the secondary volume to be written with the third data specified using the third mapping information, and for writing fourth data in a relevant secondary volume upon receiving from the second host system a command for writing the fourth data in any one of the secondary volumes in the second secondary volume group, and sending to the third storage apparatus a fourth command for writing the fourth data in a primary volume corresponding to the secondary volume to be written with the fourth data specified using the fourth mapping information.

In this storage system, the first storage apparatus comprises a first mapping table for storing first mapping information which associates first information that specifies the respective primary volumes in the first primary volume group and second information that specifies the respective secondary volumes in the first secondary volume group. The first storage apparatus writes first data in a relevant primary volume upon receiving from the first host system a command for writing the first data in any one of the primary volumes in the first primary volume group, and sends to the second storage apparatus a first command for writing the first data in a secondary volume corresponding to the primary volume to be written with the first data specified using the first mapping information. The third storage apparatus comprises a second mapping table for storing second mapping information which associates third information that specifies the respective primary volumes in the second primary volume group and fourth information that specifies the respective volumes in the second secondary volume group. The third storage apparatus writes second data in a relevant primary volume upon receiving from the second host system a command for writing the second data in any one of the primary volumes in the second primary volume group, and sends to the second storage apparatus a second command for writing the second data in a secondary volume corresponding to the primary volume to be written with the second data specified using the second mapping information. The second storage apparatus comprises a third mapping table for storing third mapping information associated with the same contents as the first mapping information, and a fourth mapping table for storing fourth mapping information associated with the same contents as the second mapping information. The second storage apparatus writes third data in a relevant secondary volume upon receiving from the first host system a command for writing the third data in any one of the secondary volumes in the first secondary volume group, and sends to the first storage apparatus a third command for writing the third data in a primary volume corresponding to the secondary volume to be written with the third data specified using the third mapping information, and writes fourth data in a relevant secondary volume upon receiving from the second host system a command for writing the fourth data in any one of the secondary volumes in the second secondary volume group, and sends to the third storage apparatus a fourth command for writing the fourth data in a primary volume corresponding to the secondary volume to be written with the fourth data specified using the fourth mapping information. Thereby, it is possible to add a storage apparatus without going offline and duplicate data, and seek the duplication of data only by adding a second storage apparatus even when the first storage apparatus and the third storage apparatus are entirely different systems.

According to the present invention, it is possible to provide a storage system capable of adding a storage apparatus without going offline and duplicating data.

DESCRIPTION OF DRAWINGS

FIG. 3 is a diagram showing an example of a table to be stored in a shared memory according to the present invention;

FIG. 4 is a diagram showing an example of a table to be stored in a shared memory according to the present invention;

FIG. 5 is a diagram showing an example of a table to be stored in a shared memory according to the present invention;

FIG. 6 is a diagram showing an example of a table to be stored in a shared memory according to the present invention;

FIG. 7 is a diagram showing an example of a table to be stored in a shared memory according to the present invention;

FIG. 8 is a diagram showing an example of a table to be stored in a shared memory according to the present invention;

FIG. 9 is a diagram showing an example of a table to be stored in a shared memory according to the present invention;

FIG. 10 is a diagram showing an example of a table to be stored in a shared memory according to the present invention;

FIG. 11 is a diagram showing an example of a table to be stored in a shared memory according to the present invention;

FIG. 12 is a diagram showing an example of a table to be stored in a shared memory according to the present invention;

FIG. 34 is a flowchart showing the processing during failure occurrence according to the present invention;

FIG. 35 is a flowchart showing the processing during failure recovery according to the present invention;

FIG. 36 is a flowchart showing the processing during failure recovery according to the present invention;

FIG. 37 is a flowchart showing the processing during failure occurrence according to the present invention;

FIG. 38 is a flowchart showing the processing during failure recovery according to the present invention; and FIG. 39 is a diagram showing a modified example of a storage system according to the present invention.

DETAILED DESCRIPTION

An embodiment of the present invention is now explained in detail with reference to the attached drawings.

Figure 1:
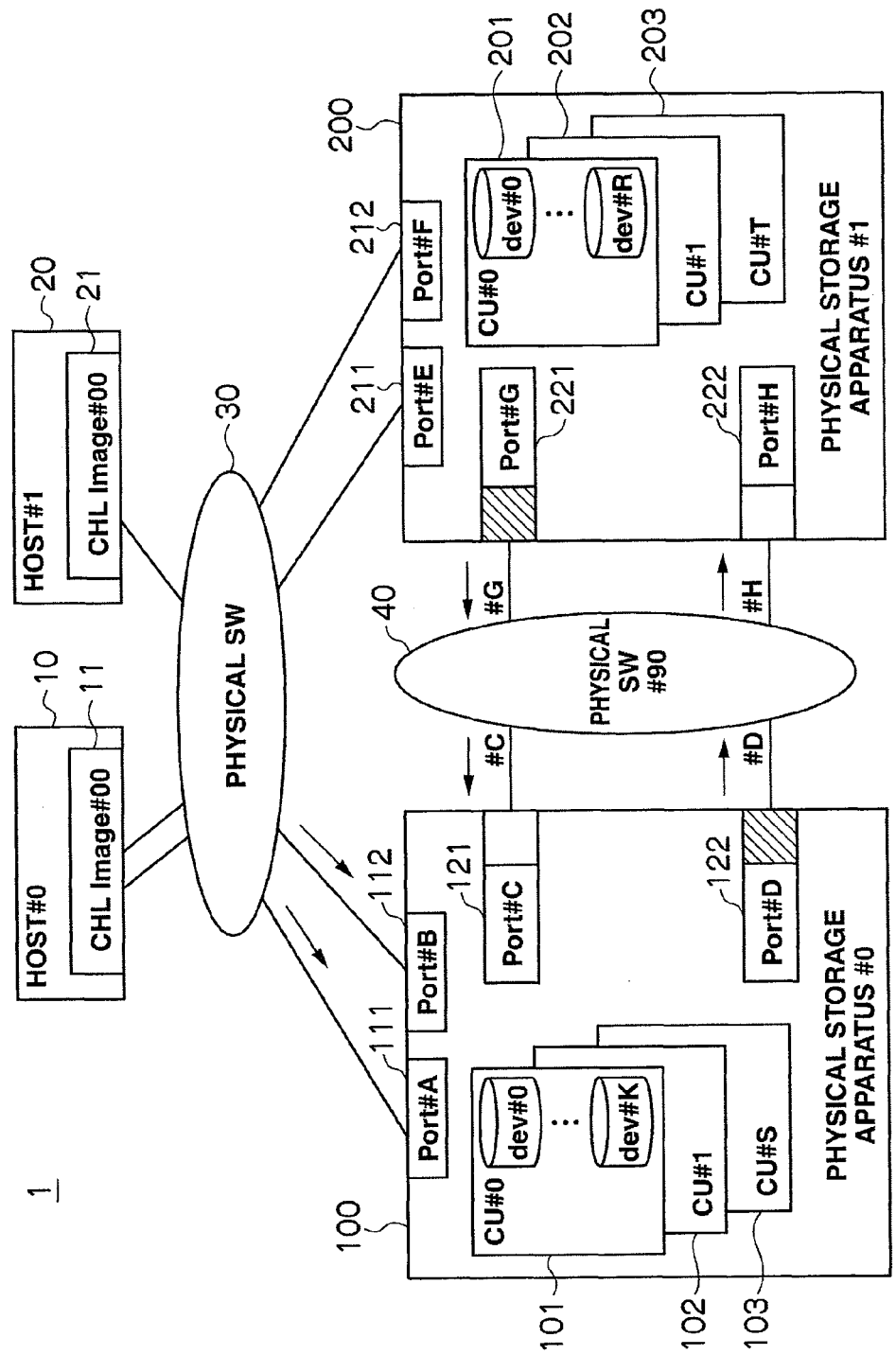
FIG. 1 is a diagram showing the overall configuration of a storage system according the present invention.

FIG. 1 is a diagram showing the overall configuration of a storage system. As shown in FIG. 1, the storage system 1 is configured by a host system (HOST #0) 10, a host system (HOST #1) 20, a storage apparatus (physical storage apparatus #0) 100 and a storage apparatus (physical storage apparatus #1) 200 being connected via a physical switch (SW) 30. Incidentally, the host systems 10, 20 and the storage apparatuses 100, 200 are respectively connected with a path group. Further, the path groups connected from the host systems 10, 20 to the disk adapters (DKA) described later in the storage apparatus 100 and the storage apparatus 200 must be the same path group. Incidentally, the physical switch 30 may be omitted in the configuration of the storage system 1.

The storage apparatus 100 and the storage apparatus 200 are connected via a physical switch (SW #90) 40. The physical switch 40 is provided with physical ports; namely, port number #C, port number #D, port number #G and port number #H.

Incidentally, in this embodiment, the storage apparatus 100 connected to the storage system 1 in advance is sometimes referred to as a primary apparatus, and the storage apparatus 200 to be added for realizing the duplication of data is sometimes referred to as a secondary apparatus. Further, although only two host systems 10, 20 are shown in FIG. 1, three or more host systems may also be used.

The host system 10 is provided with a channel image (CHL Image #00) 11, which is a logical host system, and the host system 20 is provided with a channel image (CHL Image #00) 21, which is also a logical host system.

The storage apparatus 100 is provided with a port (Port #A) 111, a port (Port #B) 112, a port (Port #C) 121, and a port (Port #D) 122. The port 111 and the port 112 are used for performing data communication with the host systems 10, 20 via the physical switch 30. Moreover, the port 121 and the port 122 are used for performing data communication with the storage apparatus 200 via the physical switch 40.

The ports 111, 112 and 121 are target ports, and the port 122 is an initiator port. The ports 111 and 112 receive a frame of a read/write command from the host systems 10, 20, and also send a reply frame. The port 121 is connected to an initiator port (port 221 described later) of the storage apparatus 200 via the port #C and the port #G, and receives a frame of a read/write command from the storage apparatus 200, and also sends a reply frame. Further, the port 122 is connected to a target port (port 222 described later) of the storage apparatus 200 via the port #D and the port #H, and, on behalf of the host system, issues a frame of a read/write command to the storage apparatus 200, and receives a reply frame from the storage apparatus 200.

Provided inside the storage apparatus 100 are a control unit (CU #0) 101, a control unit (CU #1) 102, and a control unit (CU #S) 103. Each control unit 101, 102 and 103 is provided with 256 devices (dev #0, . . . , dev #K). Incidentally, although a case is illustrated where three control units; namely, control units 101, 102 and 103 are used, the number of control units to be provided in the storage apparatus 100 is not limited thereto. Further, in this embodiment, a volume is referred to as a device (logical device) in the following explanation.

The storage apparatus 200 is provided with a port (Port #E) 211, a port (Port #F) 212, a port (Port #G) 221 and a port (Port #H) 222. The port 211 and the port 212 are used for performing data communication with the host systems 10, 20 via the physical switch 30. Further, the port 221 and the port 222 are used for performing data communication with the storage apparatus 100 via the physical switch 40.

The ports 211, 212 and 222 are target ports, and the port 221 is an initiator port. The ports 211 and 212 receive a frame of a read/write command from the host systems 10, 20, and also send a reply frame. The port 222 is connected to an initiator port (port 122) of the storage apparatus 100 via the port #H and the port #D, and receives a frame of a read/write command from the storage apparatus 100, and also sends a reply frame. Further, the port 221 is connected to a target port (port 121) of the storage apparatus 100 via the port #G and the port #C, and, on behalf of the host system, issues a frame of a read/write command to the storage apparatus 100, and receives a reply frame from the storage apparatus 100.

Provided inside the storage apparatus 200 are a control unit (CU #0) 201, a control unit (CU #1) 202, and a control unit (CU #T) 203. Each control unit 201, 202 and 203 is provided with 256 devices (dev #0, . . . , dev #R). Incidentally, although a case is illustrated where three control units; namely, control units 201, 202 and 203 are used, the number of control units to be provided in the storage apparatus 200 is not limited thereto.

Further, the host systems 10, 20 are mainframe host systems, and paths including the physical switch (SW) 30, the control units 101, 102 and 103, the control units 201, 202 and 203, and the DEV# of these control units 101, 102, 103, 201, 202 and 203 are defined in advance by a system generation, and managed by the host systems 10, 20.

As described above, a plurality of paths (two paths or more), to which the port 121 and the port 221, and the port 122 and the port 222 are connected via the physical switch 40, are configured between the storage apparatus 100 and the storage apparatus 200. Incidentally, in order for each storage apparatus 100, 200 to hold an alternate path, each storage apparatus 100, 200 needs to hold at least one initiator port path and one target port path.

Moreover, the connection between the storage apparatus 100 and the storage apparatus 200 may be made according to a method based on a fibre protocol with the interposition of a channel adapter (CHA) described later, or a method based on a unique interface may be used to connect the storage apparatus 100 and the storage apparatus 200. The connection of the storage apparatus 100 and the storage apparatus 200 does not have to be a configuration using the physical switch 40, and may also be a direct (point-to-point) connection.

Figure 2:
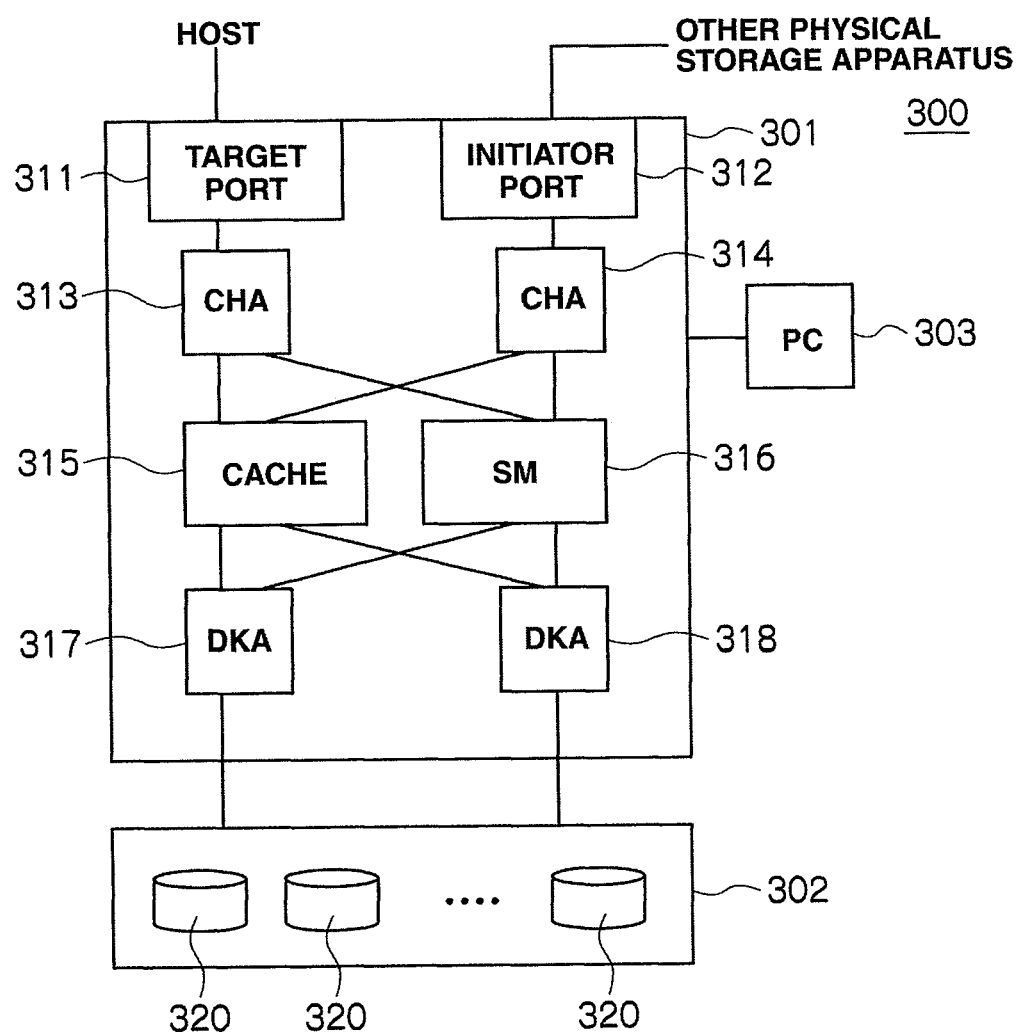
FIG. 2 is a diagram explaining a configuration common to the storage apparatuses of the present invention.

Configuration of the storage apparatuses 100, 200 is now explained. Since the storage apparatuses 100 and 200 are configured similarly, FIG. 2 is referred to for the explanation. FIG. 2 is a diagram showing a storage apparatus 300 for schematically explaining the configuration common to the storage apparatuses 100, 200.

The storage apparatus 300 is configured from a controller unit 301 and a disk unit 302. The controller unit 301 is configured from a target port 311, an initiator port 312, channel adapters (CHA) 313, 314, a cache memory (CACHE) 315, a shared memory (SM) 316, and disk adapters (DKA) 317, 318. Further, the disk unit 302 is provided with a plurality of disks 320. Incidentally, the disks 320, for example, are hard disk drives. Moreover, the storage apparatus 300 is connected to a personal computer (PC) 303 having an operation panel and a display unit.

The target port 311 is connected to the host system 10 or 20, and the initiator port 312 is connected to another storage apparatus.

The channel adapters 313, 314 are processors that interpret the various commands sent from the host systems 10, 20 via the physical switch 30 and execute corresponding processing. As such processing, for instance, there is interactive copy control between the storage apparatus 100 and the storage apparatus 200, control with the host system, and control with the other storage apparatus.

The cache memory 315 and the shared memory 316 are storage memories to be shared by the channel adapters 313, 314 and the disk adapters 317, 318. The cache memory 315 is primarily used for temporarily storing write-target data and read-target data to be input to and output from the storage apparatus 300. The shared memory 316 is primarily used for storing system configuration information concerning the overall configuration of the storage apparatus 300, various programs, various tables, commands such as write requests and read requests, and management information for performing interactive copy control.

The disk adapters 317, 318 are respectively configured as a micro computer system comprising a CPU (Central Processing Unit), a memory and the like, and control the reading and writing of data from and into the disks 320. The disk adapters 317, 318, for instance, write commands and data received and interpreted by the channel adapter 313 into a prescribed address of the disk 320.

The personal computer 303 is used for setting management information in realizing interactive copy using the storage apparatus 300. Incidentally, in this embodiment, although a case is illustrated where the personal computer 303 connected to the storage apparatus 300 sets the various tables stored in the shared memory 316, a SAP (maintenance terminal) or a remote console may also be used to set the various tables.

The various tables stored in the shared memory 316 are now explained with reference to FIG. 3 to FIG. 12.

FIG. 3 is a diagram showing a table TA1 to be stored in the shared memory 316 of the storage apparatus 100. As shown in FIG. 3, the table TA1 stores the setting of port attributes in relation to the port# (port 111, port 112, port 121 and port 122). The table TA1 shows that the port 111 (port #A) and the port 112 (port #B) are set as target ports; that is, they are the target ports of the host systems 10, 20. Further, the port 121 (port #C) is set as an interactive copy target port, and the port 122 (port #D) is set as an interactive copy initiator port.

FIG. 4 is a diagram showing a table TA2 to be stored in the shared memory 316 of the storage apparatus 200. As shown in FIG. 4, the table TA2 stores the setting of port attributes in relation to the port # (port 211, port 212, port 221 and port 222). The table TA2 shows that the port 211 (port #E) and the port 212 (port #F) are set as target ports; that is, they are the target ports of the host systems 10, 20. Further, the port 221 (port #G) is set as an interactive copy initiator port, and the port 222 (port #H) is set as an interactive copy target port.

FIG. 5 is a diagram showing a table TB1 to be stored in the shared memory 316 of the storage apparatus 100. As shown in FIG. 5, the table TB1 is a table for setting physical communication paths, and a physical port number, an adjacent switch/port number, a target storage apparatus number, and a destination switch/port number are set in accordance with an inter-storage physical path number.

As shown in the inter-storage physical path number 1, the physical port #C is set with a physical switch #90 (physical switch 40) and a port #C (port 121) as the adjacent switch/port#, "1" (storage apparatus 200) as the target storage apparatus#, and a physical switch #90 (physical switch 40) and a port #H (port 222) as a destination switch/port.

Further, as shown in the inter-storage physical path number 2, the physical port #C is set with a physical switch #90 (physical switch 40) and a port #C (port 121) as the adjacent switch/port#, "1" (storage apparatus 200) as the target storage apparatus#, and a physical switch #90 (physical switch 40) and a port #G (port 221) as the destination switch/port.

As shown in the inter-storage physical path number 3, the physical port #D is set with a physical switch #90 (physical switch 40) and a port #D (port 122) as the adjacent switch/port#, "1" (storage apparatus 200) as the target storage apparatus#, and a physical switch #90 (physical switch 40) and a port #H (port 222) as the destination switch/port.

As shown in the inter-storage physical path number 4, the physical port #D is set with a physical switch #90 (physical switch 40) and a port #D (port 122) as the adjacent switch/port#, "1" (storage apparatus 200) as the target storage apparatus#, and a physical switch #90 (physical switch 40) and a port #G (port 221) as the destination switch/port.

FIG. 6 is a diagram showing a table TB2 to be stored in the shared memory 316 of the storage apparatus 200. As shown in FIG. 6, the table TB2 is a table for setting physical communication paths, and a physical port number, an adjacent switch/port number, a target storage apparatus number, and a destination switch/port number are set in accordance with the inter-storage physical path number.

As shown in the inter-storage physical path number 1, the physical port #G is set with a physical switch #90 (physical switch 40) and a port #G (port 221) as the adjacent switch/port, "0" (storage apparatus 100) as the target storage apparatus#, and a physical switch #90 (physical switch 40) and a port #C (port 121) as the destination switch/port.

Further, as shown in the inter-storage physical path number 2, the physical port #G is set with a physical switch #90 (physical switch 40) and a port #G (port 221) as the adjacent switch/port, "0" (storage apparatus 100) as the target storage apparatus#, and a physical switch #90 (physical switch 40) and a port #D (port 122) as the destination switch/port.

As shown in the inter-storage physical path number 3, the physical port #H is set with a physical switch #90 (physical switch 40) and a port #H (port 222) as the adjacent switch/port, "0" (storage apparatus 100) as the target storage apparatus#, and a physical switch #90 (physical switch 40) and a port #C (port 121) as the destination switch/port.

As shown in the inter-storage physical path number 4, the physical port #H is set with a physical switch #90 (physical switch 40) and a port #H (port 222) as the adjacent switch/port, "0" (storage apparatus 100) as the target storage apparatus#, and a physical switch #90 (physical switch 40) and a port #D (port 122) as the destination switch/port.

FIG. 7 is a diagram showing a table TC1 to be stored in the shared memory 316 of the storage apparatus 100. As shown in FIG. 7, the table TC1 is a logical path table, and a physical port number and a destination control unit number are set in accordance with an inter-storage physical path number. The control unit in the storage apparatus 200 to be accessed via the physical port is decided based on the setting of the table TC1.

FIG. 8 is a diagram showing a table TC2 to be stored in the shared memory 316 of the storage apparatus 200. As shown in FIG. 8, the table TC2 is a logical path table, and a physical port number and a destination control unit number are set in accordance with an inter-storage path physical path number. The control unit in the storage apparatus 100 to be accessed via the physical port is decided based on the setting of the table TC2.

FIG. 9 is a diagram showing a table TD1 to be stored in the shared memory 316 of the storage apparatus 100. As shown in FIG. 9, the table TD1 is a diagram showing a device mapping table for controlling the interactive copy process, and mapping information such as a device group (Diver), a device status (DEVstatus), a copy status, a destination storage ID number (ID#), a destination subsystem ID number (SSID#), a destination control unit number (CU#) and a destination device number (DEV#) is set in correspondence to the device specified with a control unit number (self storage CU#) and a device number (self storage DEV#) of the storage apparatus 100. Incidentally, a subsystem ID number is information for the host system to uniquely identify the subsystem.

The device group is set with information regarding whether it is "primary" or "secondary". The device status is registered with information regarding whether it is of a "normal" status or a "blocked" status. The copy status is registered with information regarding whether it is of a "Duplex" status or a "Suspend" status. "Duplex" shows that the interactive copy is in the latest status, and "Suspend" shows that the copy status is in a suspended state. The device in the copy destination storage apparatus 200 is decided based on the destination storage ID number, the destination subsystem ID number, the destination control unit number and the destination device number.

FIG. 10 is a diagram showing a table TD2 to be stored in the shared memory 316 of the storage apparatus 200. As shown in FIG. 10, the table TD2 is a diagram showing a device mapping table for controlling the interactive copy process, and mapping information such as a device group (DEVgr), a device status (DEVstatus), a copy status, a destination storage ID number (ID#), a destination subsystem ID number (SSID#), a destination control unit number (CU#) and a destination device number (DEV#) is set in correspondence to a device specified with a control unit number (self storage CU#) and a device number (self storage DEV#) of the storage apparatus 100. Incidentally, explanation on the respective components is the same as the case of the table TD1, and such explanation is omitted.

In this embodiment, the foregoing table TD1, the table TD2 and the like are stored in the storage apparatus 100 and the storage apparatus 200 in order to realize the interactive copy between the storage apparatus 100 and the storage apparatus 200.

FIG. 11 is a diagram showing a table TE to be stored in the shared memory 316 of the storage apparatus 100. The table TE stores discovery information such as a port number (port #), a control unit number (CU#) and a device number (DEV#) in association with a destination storage ID number (ID#).

FIG. 12 is a diagram showing a table TF to be stored in the shared memory 316 of the storage apparatus 200. As shown in FIG. 12, the table TF is a table for setting whether it is a primary apparatus or a secondary apparatus, and a primary/secondary apparatus attribute is set together with a self storage ID. In the storage apparatus 200, "1" is set as the self storage ID, and "secondary" is set as the primary/secondary apparatus attribute since it is a secondary apparatus. In the table TF, for instance, since a primary apparatus is set in a default status, the user changes the attribute setting from a primary apparatus to a secondary apparatus using the personal computer 303 connected to the storage apparatus 200.

Incidentally, although not shown, similar tables are stored in the shared memory 316 of the storage apparatus 100, and "0" is set as the self storage ID, and "primary" is set as the apparatus attribute.

FIG. 13 to FIG. 17 are diagrams showing a setting screen to be used upon setting the interactive copy to be displayed on a display unit of the personal computer 303. The interactive copy of data between the storage apparatus 100 and the storage apparatus 200 is enabled by setting the various tables to be stored in the shared memory 316 while viewing the setting screen. Incidentally, the setting screen explained with reference to FIG. 13 to FIG. 17 is an example of a setting screen to be used upon adding the storage apparatus 200.

Figure 13:
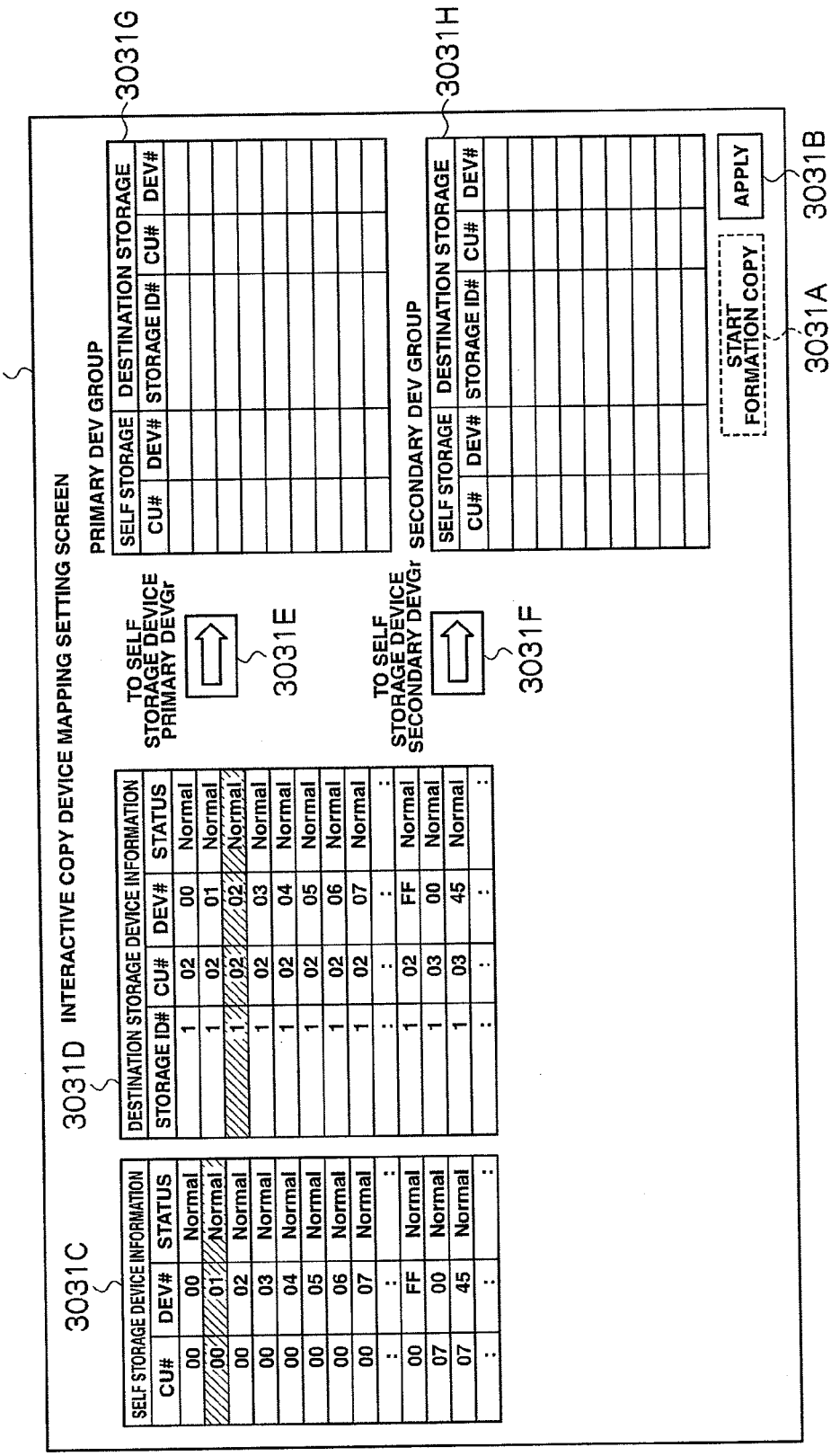
FIG. 13 is a diagram showing an example of an interactive copy device mapping setting screen according to the present invention.
Figure 14:
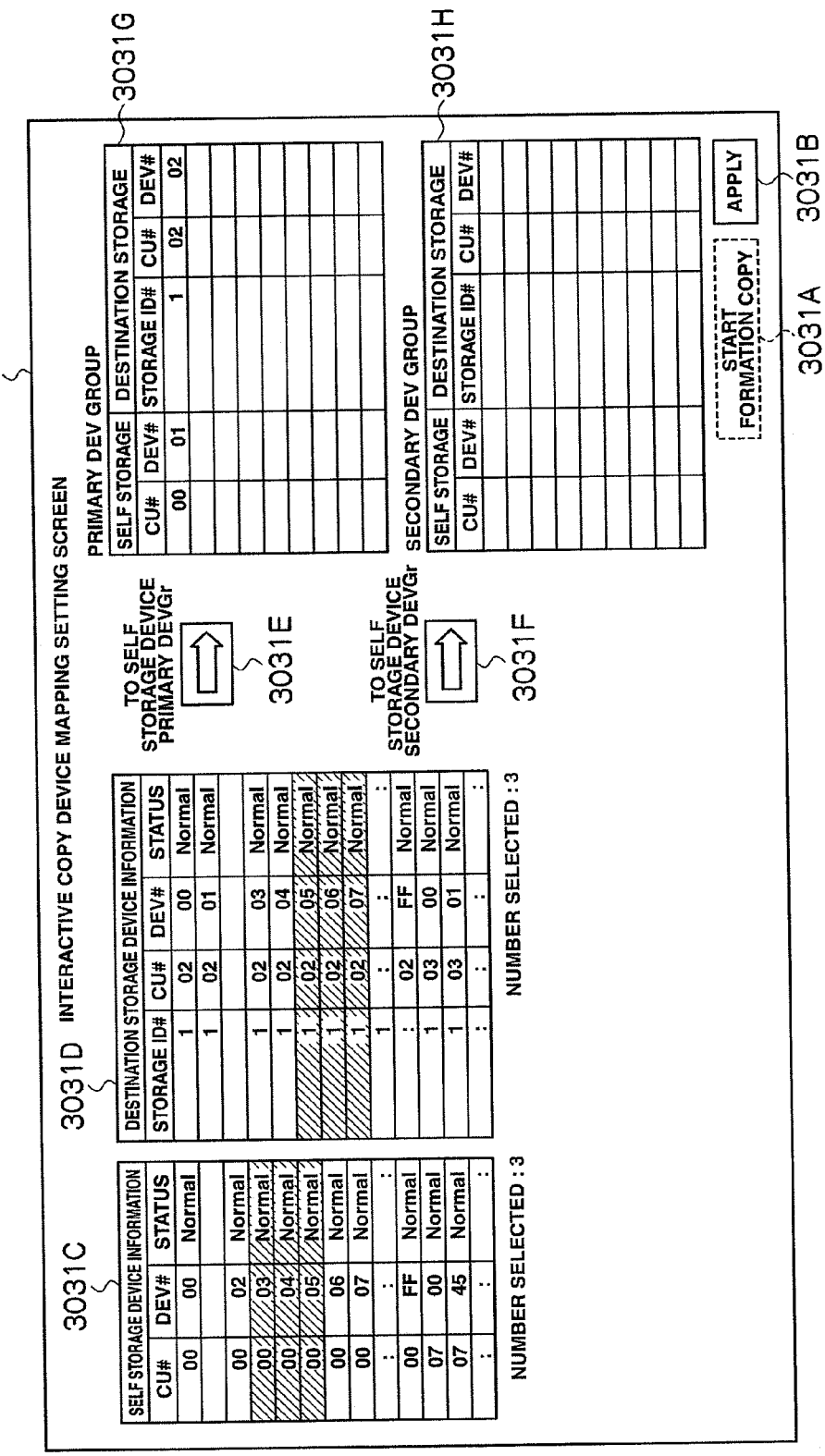
FIG. 14 is a diagram showing an example of an interactive copy device mapping setting screen according to the present invention.
Figure 15:
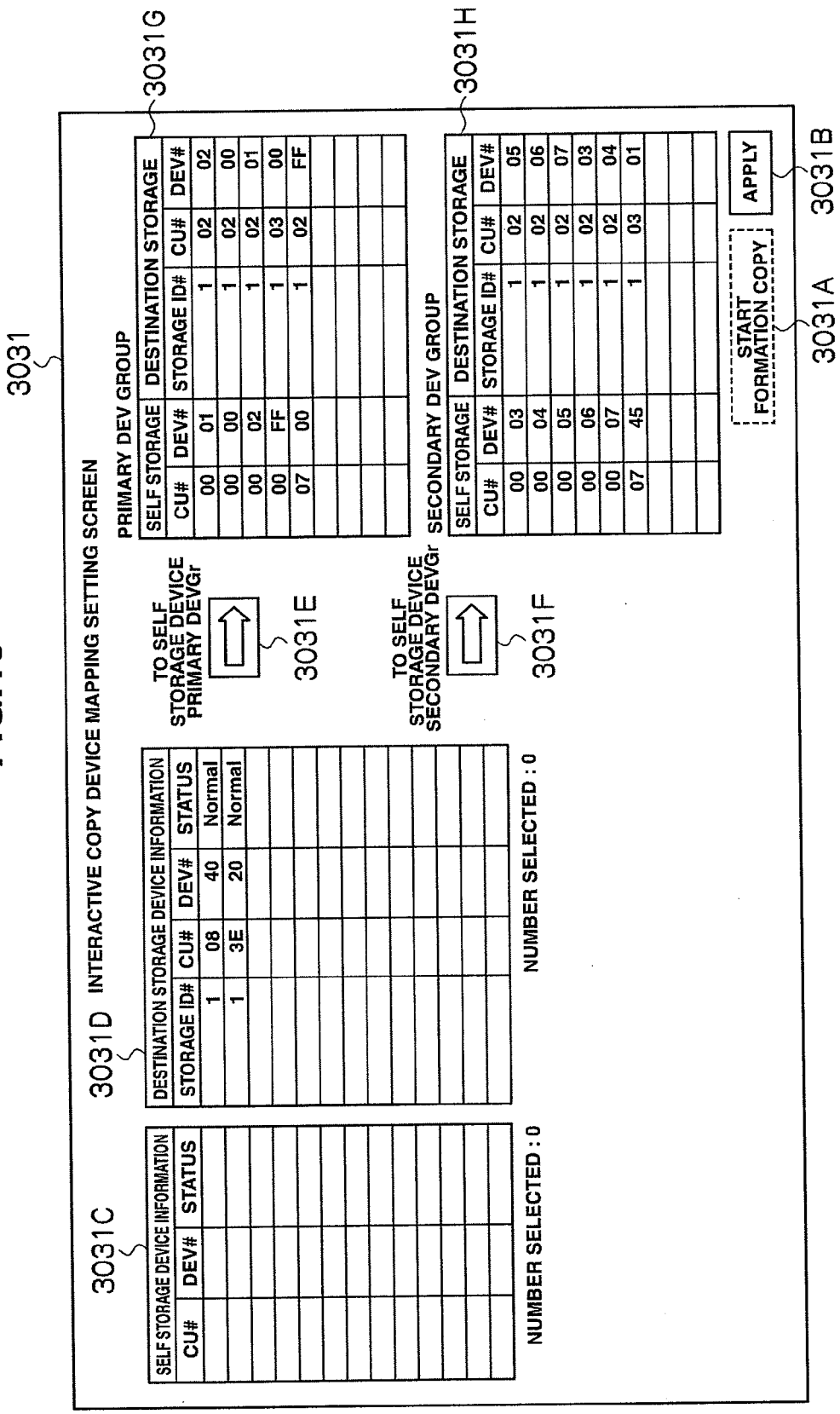
FIG. 15 is a diagram showing an example of an interactive copy device mapping setting screen according to the present invention.

FIG. 13 to FIG. 15 show an interactive copy device mapping setting screen 3031 to be displayed on the display of a display unit of the personal computer 303. As shown in FIG. 13, the interactive copy device mapping setting screen 3031 displays a formation copy start button 3031A, an apply button 3031B, a self storage device information column 3031C, a destination storage device information column 3031D, an arrow button 3031E, an arrow button 3031F, a primary device (DEV) group column 3031G, and a secondary device (DEV) group column 3031H.

The formation copy start button 3031A is a button for starting the formation copy of the primary device group and the secondary device group. The apply button 3031B is a button for deciding the application of the device selected in the self storage device information column 3031C and the destination storage device information column 3031D as the primary/secondary group. The arrow button 3031E is a button for registering the self storage device in the primary device group (DEVgr). The arrow button 3031F is a button for registering the self storage device in the secondary device group (DEVgr).

The self storage device information column 3031C displays self storage device information. As the self storage device information, items concerning information on the control unit number (CU#), the device number (DEV#) and the status are respectively associated and displayed. For example, the status of the device specified based on the control unit number "00" and the device number "00" is displayed as "Normal". Incidentally, the status of "Normal" shows that the device is of a normal status.

The destination storage device information column 3031D displays destination storage device information. As the destination storage information, items concerning information on the destination storage ID number (ID#), the control unit number (CU#), the device number (DEV#) and the status are respectively associated and displayed. For example, the status of the device specified based on the storage apparatus number "1", the control unit number "02" and the device number "00" is displayed as "Normal". Incidentally, the status of "Normal" shows that the device is of a normal status.

The devices displayed on the self storage device information column 3031C and the destination storage device information column 3031D may be respectively selected by the user through operation of the operation panel of the personal computer 303. Incidentally, the selected device, for instance, can be visually checked by the user as a result of changing the color of the column to display the device or other methods.

The primary device (DEV) group column 3031G associates and displays the self storage control unit number (CU#) and device number (DEV#), as well as the destination storage ID (ID#), control unit number (CU#) and device number (DEV#). At the stage illustrated in FIG. 13, since the application of the primary/secondary device group is not yet decided, the primary device group column 3031G is an empty column.

The secondary device (DEV) group column 3031H associates the self storage control unit number (CU#) and device number (DEV#), as well as the destination storage ID (ID#), control unit number (CU#) and device number (DEV#). As the stage illustrated in FIG. 13, since the application of the primary/secondary device group is not yet decided, the secondary device group column 3031H is an empty column.

Further, in FIG. 13, the items of CU# "00", DEV# "01" and status "Normal" are selected as the self storage device information column 3031C, and the items of storage ID# "1", CU# "02", DEV# "02" and status "Normal" are selected as the destination storage device information column 3031D. Like this, in a state where each item has been selected by the user, when the user uses the operation panel of the personal computer 303 to press the arrow button 3031E or the arrow button 3031F, the selected information is registered in the primary device group column 3031G or the secondary device group column 3031H.

Incidentally, in FIG. 13, although only one item is selected in the self storage device information column 3031C and the destination storage device information column 3031D, respectively, it is also possible to select a plurality of items to designate the primary device group column 3031G or the secondary device group column 3031H at once.

When the primary device group column 3031G or the secondary device group column 3031H is designated as a result of the arrow button 3031E or the arrow button 3031F being pressed, the items selected in the self storage device information column 3031C and the destination storage device information column 3031D are deleted, and registered in the primary device group column 3031G or the secondary device group 3031 column H.

FIG. 14 is a diagram showing a state where the items selected in FIG. 13 are registered in the primary device group column 3031G. As shown in FIG. 14, the control unit number "00" and the device number "01" in the self storage device information column 3031C and the storage ID number "1", the control unit number "02" and the device number "02" in the destination storage information column 3031D selected in FIG. 13 are registered as a primary device group in the primary device group column 3031G.

Further, FIG. 14 shows a state where a plurality of items are selected in the self storage device information column 3031C and the destination storage device information column 3031D. Here, "3" showing the number of items selected is displayed below the self storage device information column 3031C and the destination storage device information column 3031D, respectively.

Incidentally, the formation copy start button 3031A cannot be pressed regarding all items displayed in the self storage device information column 3031C until the designation of the primary device group column 3031G or the secondary device group column 3031H is finished.

FIG. 15 is a diagram showing a state where all items displayed in the self storage device information column 3031C have been registered in the primary device group column 3031G or the secondary device group column 3031H, and the formation copy start button 3031A can be pressed.

Figure 16:
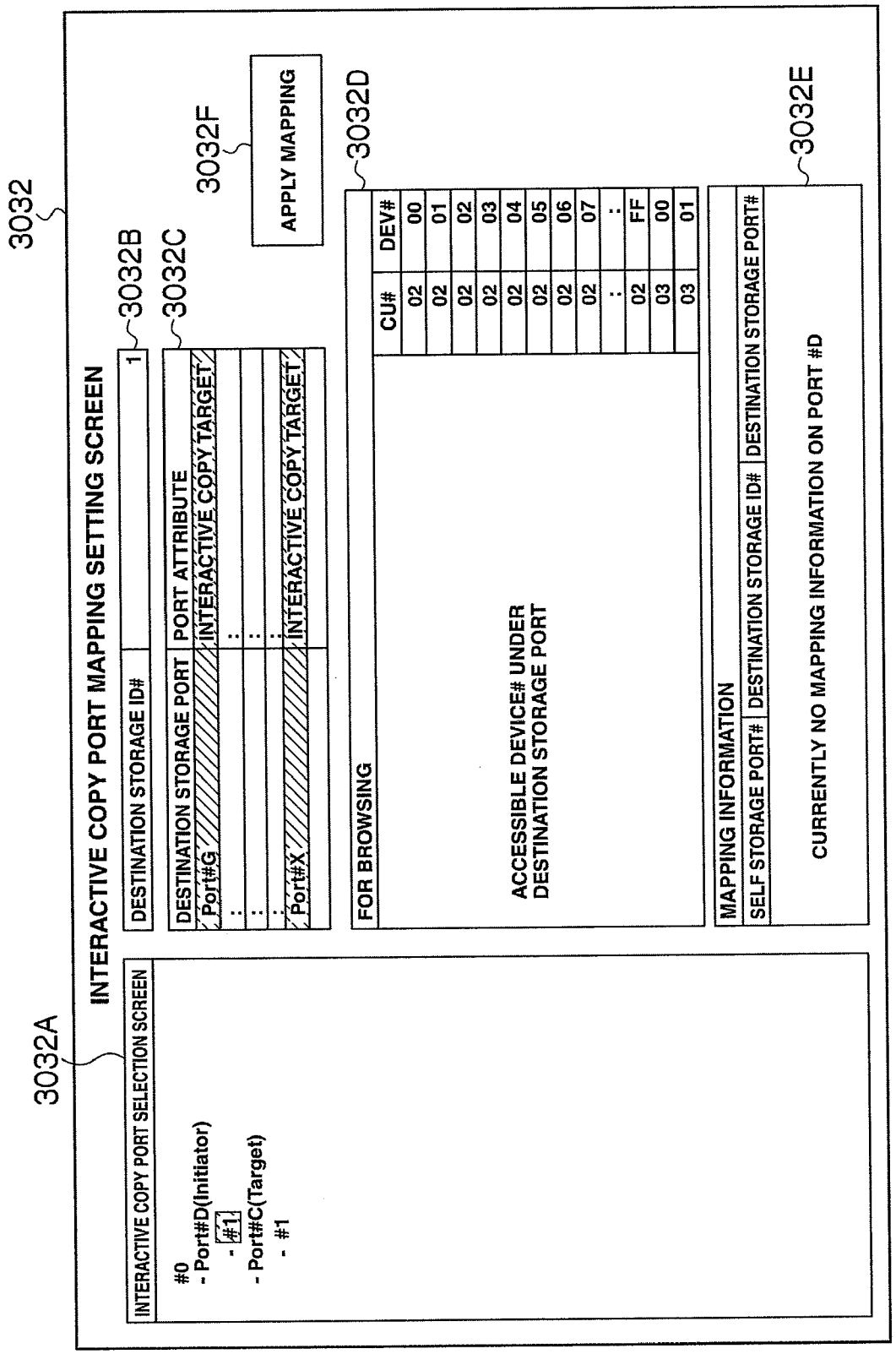
FIG. 16 is a diagram showing an example of an interactive copy port mapping setting screen according to the present invention.
Figure 17:
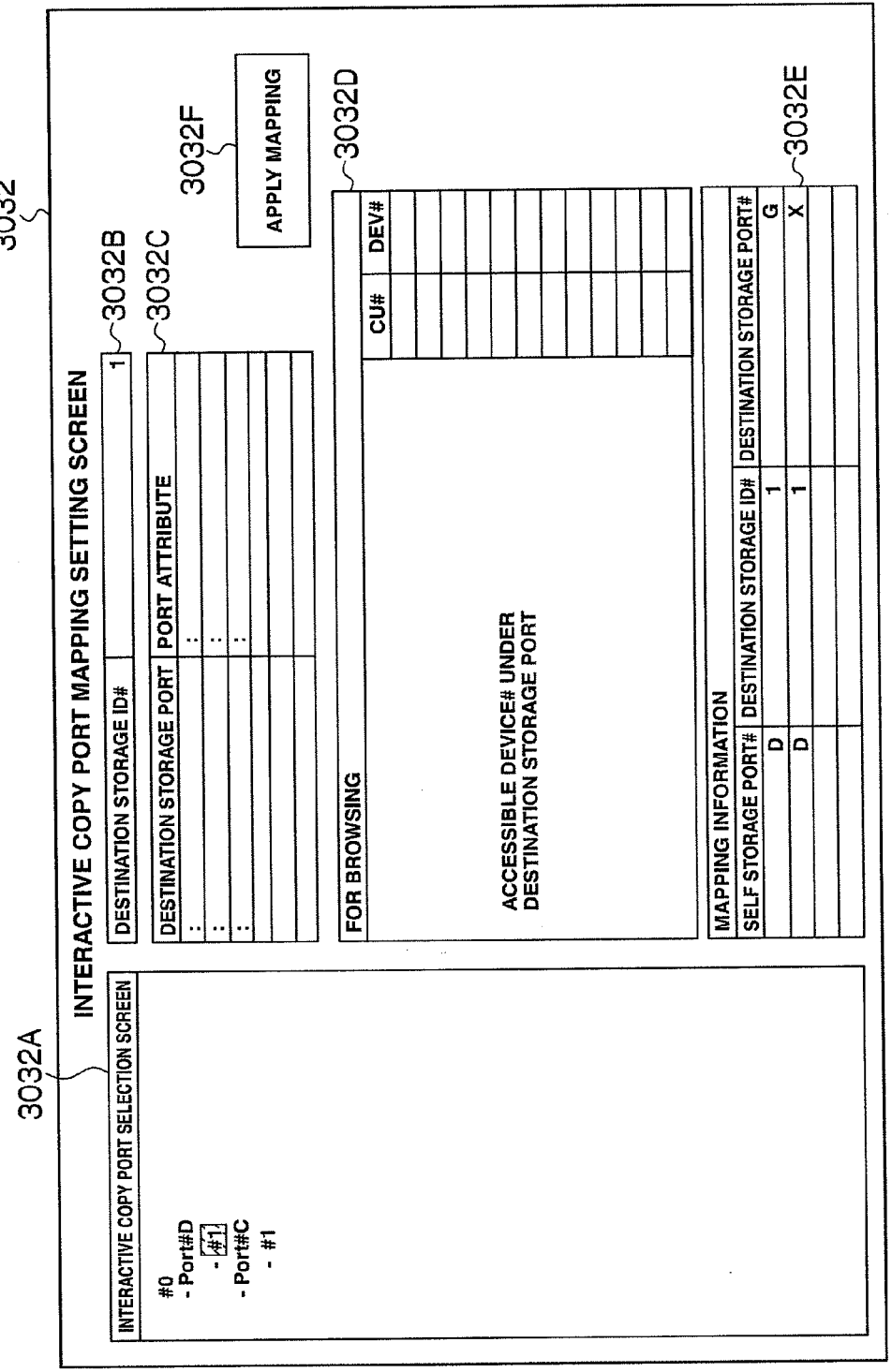
FIG. 17 is a diagram showing an example of an interactive copy port mapping setting screen according to the present invention.

FIG. 16 and FIG. 17 are diagram showing the interactive copy port mapping setting screen 3032 to be displayed on the display unit of the personal computer 303. As shown in FIG. 16, the interactive copy port mapping setting screen 3032 displays an interactive copy port selection screen column 3032A, a destination storage ID# column 3032B, a destination storage port and port attribute column 3032C, a perusal display column 3032D, a mapping information column 3032E and a mapping apply button 3032F.

The interactive copy port mapping setting screen 3032 is used to set the mapping of ports concerning the interactive copy initiator and the interactive copy target. Incidentally, although this setting may be made using the personal computer 303 connected to either the storage apparatus 100 or the storage apparatus 200, in this embodiment, the setting is made using the personal computer 303 connected to the storage apparatus 100.

The interactive copy port selection screen column 3032A displays "#0" showing the self storage ID number, "-Port #D (Initiator)" showing the self storage interactive copy initiator port, "#1" showing the destination storage ID, "-Port #C (Target)" showing the self storage interactive copy target port, and "#1" showing the destination storage ID. Incidentally, when the initiator is selected in the interactive copy port selection screen column 3032A, only the interactive copy target is displayed on the interactive copy port mapping setting screen column 3032.

The destination storage ID# column 3032B displays the destination storage ID number. The items concerning the destination storage port and the port attribute are associated in the destination storage port and port attribute column 3032C. For example, one port attribute is selected for one destination storage port such as an "interactive copy target" for the "Port #G", and an "interactive copy target" for the "Port #X".

The perusal display column 3032D displays an accessible device number under the port of the destination storage apparatus. This display is made upon associating the control unit number (CU#) and the device number (DEV#). For example, the control number "02" and the device number "00" are displayed as the accessible device. The mapping information column 3032E associates and displays the self storage port number (port#), the destination storage ID number (ID#) and the destination storage port number (port#). In FIG. 16, since registration has not yet been made regarding the port #D, a message to the effect of "CURRENTLY NO MAPPING INFORMATION ON PORT #D" is displayed.

FIG. 17 is a diagram showing a state where the mapping apply button 3032F has been pressed in FIG. 16. As shown in FIG. 17, the mapping information column 3032E registers "D" as the self storage port number, "1" as the destination storage ID number and "G" as the destination storage port number, and registers "D" as the self storage port number, "1" as the destination storage ID number and "X" as the destination storage port number. After the ports are set as described above, the mapping information column 3032E can be used to confirm the setting.

The setting routine of a user using the interactive copy device mapping setting screen 3031 and the interactive copy port mapping setting screen 3032 displayed on the display unit of the personal computer 303 to add the storage apparatus 200 to the storage system configured from the host systems 10, 20 (incidentally, the host system 20 may be removed from the configuration), the storage apparatus 100 and other components is now explained. Incidentally, this setting routine is performed by the user using the personal computer 303 connected to the respective storage apparatuses 100, 200.

Figure 18:
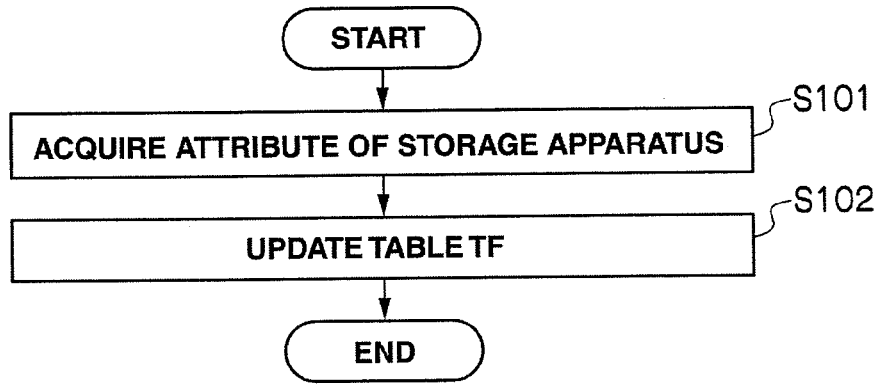
FIG. 18 is a flowchart showing the processing of a channel adapter according to the present invention.

Foremost, the user prepares the storage apparatus 200. Then, the user sets the storage apparatus 200 as a secondary apparatus. Thereby, the foregoing table TF is set. FIG. 18 is a flowchart showing the processing of the channel adapter 313 to be executed when the table TF is set. When the channel adapter 313 acquires the attribute of the storage apparatus (S101), it updates the table TF based on the acquired attribute (S102).

Figure 19:
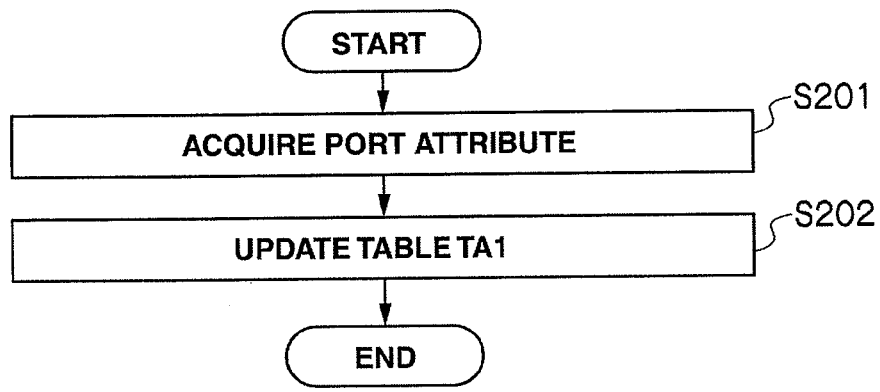
FIG. 19 is a flowchart showing the processing of a channel adapter according to the present invention.

Subsequently, the user uses each personal computer 303 to change the port attribute of the port 122 of the storage apparatus 100 and the port 221 of the storage apparatus 200 to an initiator. Thereby, the foregoing tables TA1, TA2 is set. FIG. 19 is a flowchart showing the processing to be executed by the channel adapter 313 when the tables TA1, TA2 are set. For example, when the channel adapter 313 of the storage apparatus 100 acquires the port attribute (S201), and updates the table TA1 based on the acquired port attribute (S202).

Subsequently, the user uses each personal computer 303 to connect the path from the port 122 and the port 221 set as the initiator in the respective storage apparatuses 100, 200 to the destination target port. Thereby, the path from the port 122 to the port 222, and the path from the port 221 to the port 221 is set.

Figure 20:
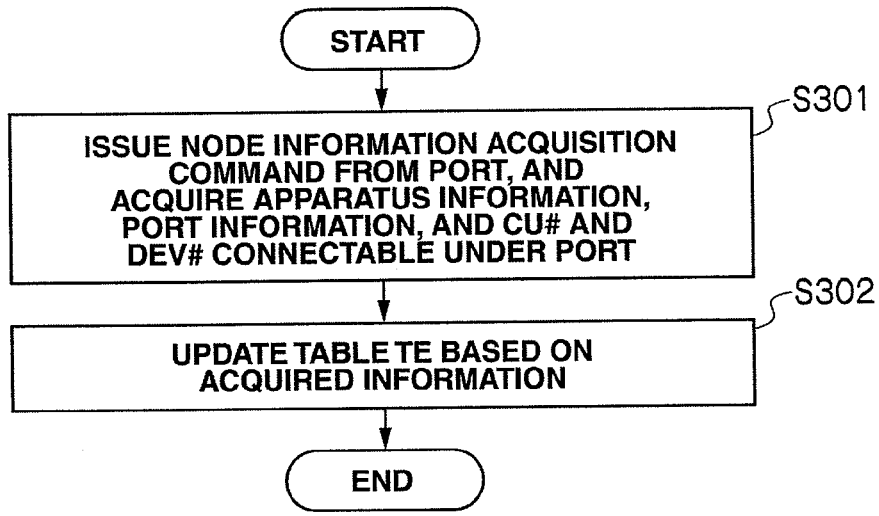
FIG. 20 is a flowchart showing the processing of a channel adapter according to the present invention.

Subsequently, the user performs discovery with the storage apparatus 100 to acquire the destination port and the device information. Thereby, discovery information is set in the foregoing table TE. FIG. 20 is a flowchart showing the processing of the channel adapter 313 to be executed when the discovery information is set in the table TE. The channel adapter 313 issues a node information acquisition command from the port, and acquires apparatus information, port information, and discovery information such as a control unit number and a device number connectable under the port (S301), and updates the table TE based on the acquired discovery information (S302).

Subsequently, the user uses the personal computer 303 to perform port mapping. In other words, the user selects the "port number of the self storage apparatus" and the "port number of the destination storage apparatus" from the information set in the table TE of the storage apparatus 100. Thereby, the foregoing table TB1 is set. When the port number is decided, the user sends the information set in the table TB1 to the storage apparatus 200 as the destination storage apparatus. Thereby, communication from the initiator port of the storage apparatus 200 to the target port of the storage apparatus 100 is established.

Figure 21:
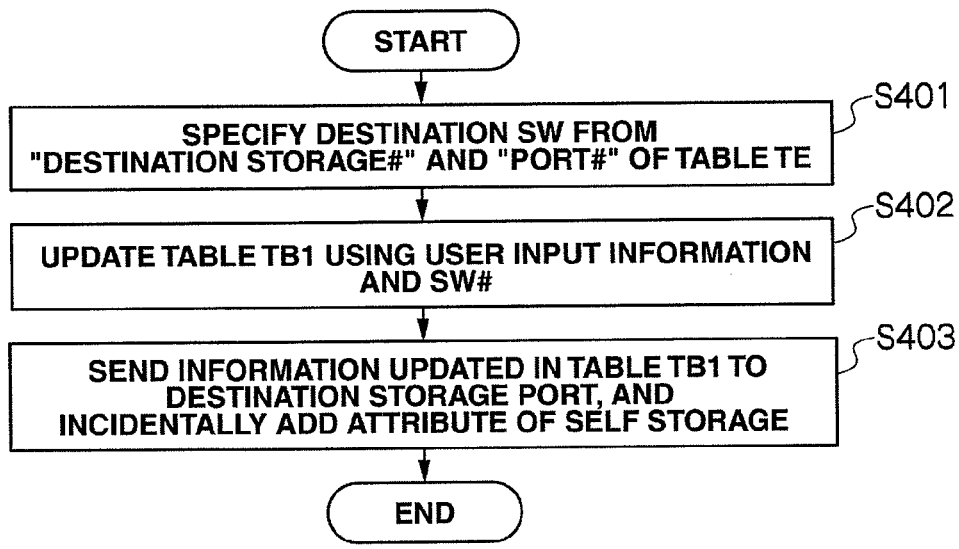
FIG. 21 is a flowchart showing the processing of a channel adapter according to the present invention.

FIG. 21 is a flowchart showing the processing of the channel adapter 313 in the storage apparatus 100 to be executed when the table TB1 is set. The channel adapter 313 specifies a destination switch from the destination storage number and the port number based on the table TE (S401), updates the table TB1 using the user input information and the switch number (SW#) (S402), and sends the information updated in the table TB1 to the destination storage port. Incidentally, upon sending the updated information, the attribute of the self storage apparatus is also added (S403).

Figure 22:
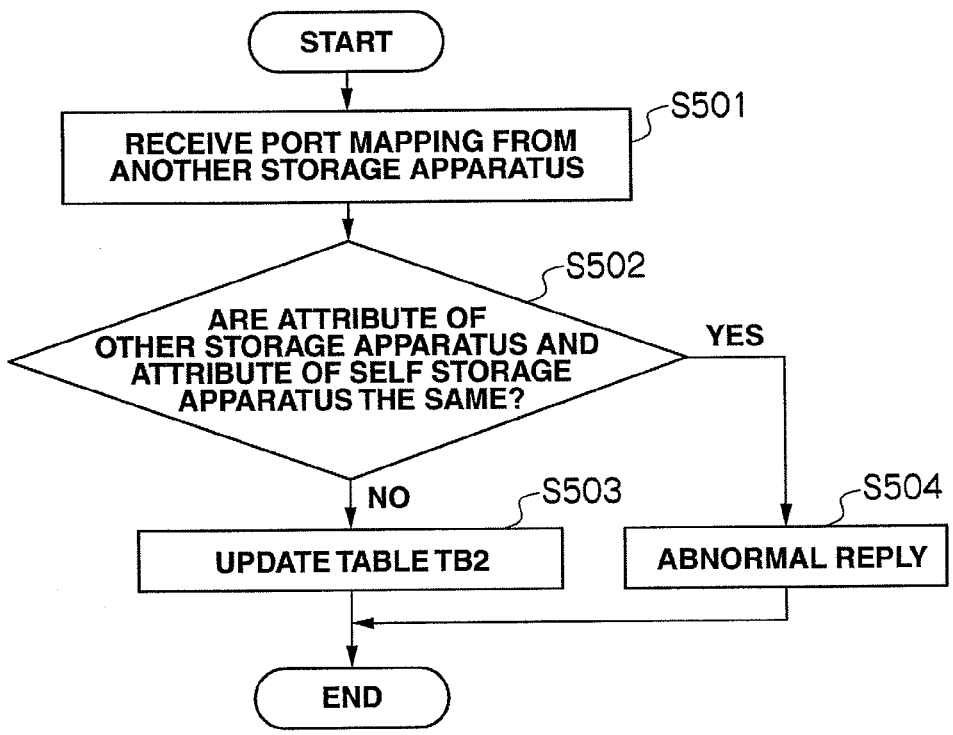
FIG. 22 is a flowchart showing the processing of a channel adapter according to the present invention.

FIG. 22 is a flowchart showing the processing of the channel adapter 313 in the storage apparatus 200 to be executed upon receiving the update information of the table TB1. When the channel adapter 313 receives a port mapping from the storage apparatus 100 as the other storage apparatus (S501) and the attribute of the other storage apparatus and the attribute of the self storage apparatus are not the same (S502: NO), it updates the table TB2 based on the received port mapping (S503), and, when the attribute of the other storage apparatus and the attribute of the self storage apparatus are the same (S502: YES), it sends an abnormal reply showing abnormality (S504).

Subsequently, the user maps the "device of the storage apparatus 100 as the self storage apparatus" and the "device of the storage apparatus 200 as the destination storage apparatus" from the discovery information set in the table TE acquired with the storage apparatus 100. As the mapping conditions, the devices to be mapped must have the same attribute in the "self storage apparatus" and the "destination storage apparatus". This setting is performed by the user selecting the "device of the storage apparatus 100" and the "device of the storage apparatus 200", selecting a device having a primary attribute and a device having a secondary attribute, and thereby performing mapping. This setting is performed using the interactive copy device mapping setting screen 3031 explained with reference to FIG. 13 and other diagrams. Each time this setting is made, the configuration defined by this mapping is sent from the storage apparatus 100 to the storage apparatus 200. Thereafter, when the storage apparatus 200 receives the defined configuration from the storage apparatus 100, it is determined whether the defined configuration can be defined. When it is determined that the defined configuration can be defined, an enable notification is issued from the storage apparatus 200 to the storage apparatus 100, and the storage apparatus 100 receives the enable notification. This process is repeated until the user sets all devices in which the generation is defined in the host system 10.

Figure 23:
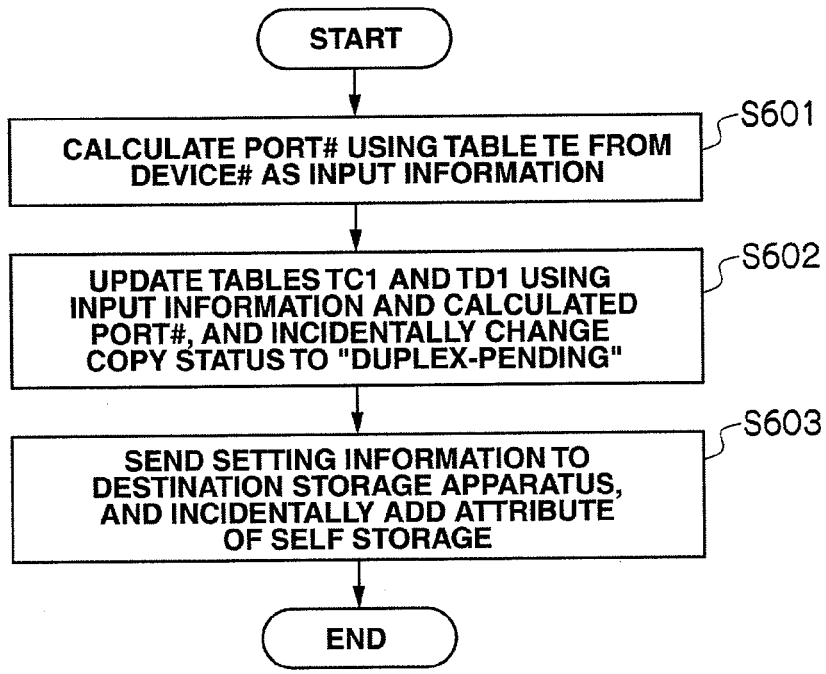
FIG. 23 is a flowchart showing the processing of a channel adapter according to the present invention.

FIG. 23 is a flowchart showing the processing of the channel adapter 313 in the storage apparatus 100 to be executed upon sending the configured defined by mapping. The channel adapter 313 uses the table TE to calculate the port number from the device number, which is input information (S601), and uses the input information and the calculated port number to update the tables TC1, TD1. Incidentally, here, the copy status is made to be "Duplex-pending" (S602). Then, the channel adapter 313 sends the setting information to the destination storage apparatus. Incidentally, here, the attribute of the self storage apparatus is added (S603).

Figure 24:
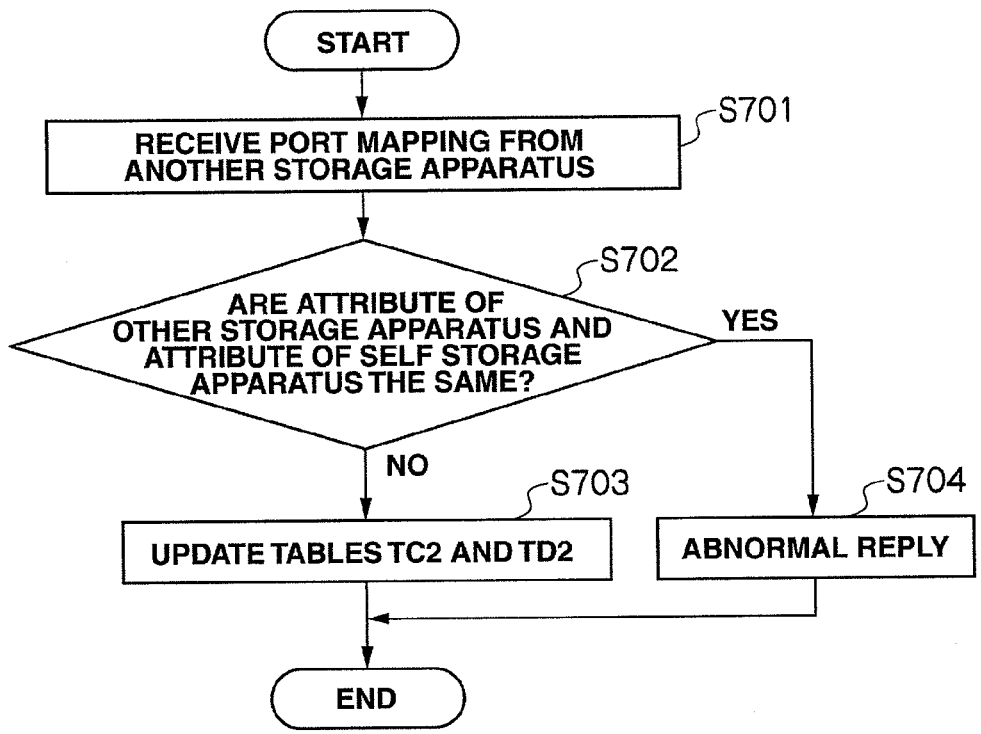
FIG. 24 is a flowchart showing the processing of a channel adapter according to the present invention.

FIG. 24 is a flowchart showing the processing of the channel adapter 313 in the storage apparatus 200 to be executed upon receiving the configuration defined by mapping. When the channel adapter 313 receives the configuration (port mapping) defined by mapping from the other storage apparatus (S701) and the attribute of the other storage apparatus and the attribute of the self storage apparatus are not the same (S702: NO), it updates the tables TC2, TD2 based on the received port mapping (S703), and, when the attribute of the other storage apparatus and the attribute of the self storage apparatus are the same (S702: YES), it sends an abnormal reply showing abnormality (S704).

Figure 25:
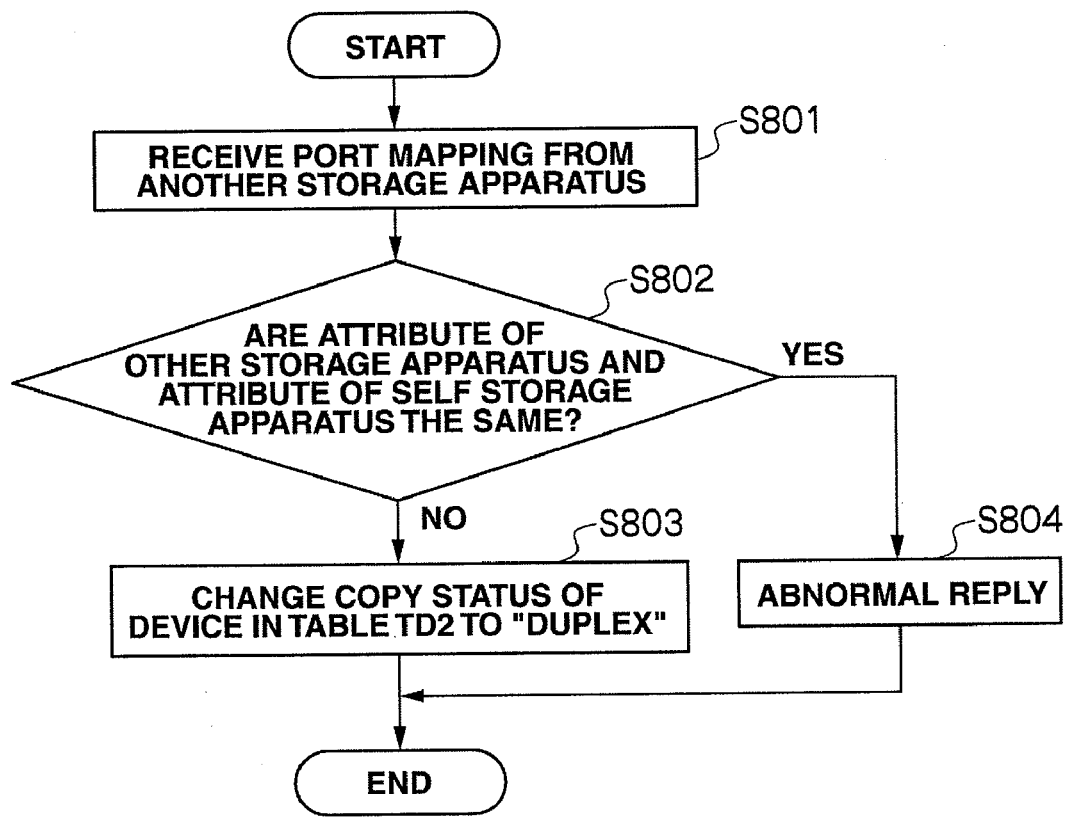
FIG. 25 is a flowchart showing the processing of a channel adapter according to the present invention.

FIG. 25 is a flowchart showing the processing of the channel adapter 313 in the storage apparatus 200 to be executed upon receiving the configuration defined by mapping. When the channel adapter 313 receives the configuration (port mapping) defined by mapping from the storage apparatus 100 as the other storage apparatus (S801) and the attribute of the other storage apparatus and the attribute of the self storage apparatus are not the same (S802: NO), it changes the copy status of the device in the table TD2 to "Duplex" based on the received port mapping (S803), and, when the attribute of the other storage apparatus and the attribute of the self storage apparatus are the same (S802: YES), it sends an abnormal reply showing abnormality (S804).

Figure 26:
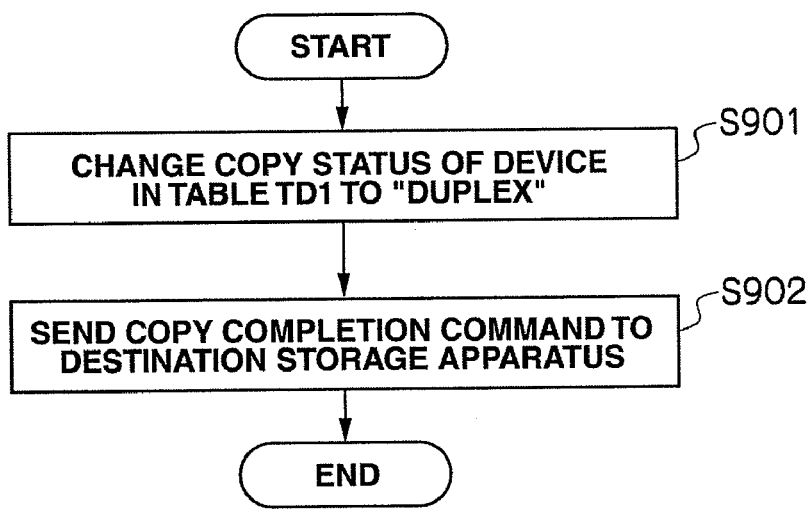
FIG. 26 is a flowchart showing the processing during IO control according to the present invention.

Subsequently, the user performs interactive copy. In other words, the user operates the personal computer 303 and presses the formation copy start button 3031A explained with reference to FIG. 15. FIG. 26 is a flowchart showing the processing to be executed by the channel adapter 313 in the storage apparatus 100 when the formation copy is finished. The channel adapter 313 changes the device copy status in the table TD1 to "Duplex" (S901), and sends a command for completing the formation copy to the destination storage apparatus (S902). When this formation copy is finished, the storage apparatus 100 issues a report indicating the completion of writing after reflecting the write IO (Input/Output) control in the storage apparatus 200 based on synchronous copy without fail.

Subsequently, the user performs setting known as misrepresentation of reporting the device mapped to the device of the storage apparatus 100 with the storage apparatus 200 as device control information of the storage apparatus 100.

Subsequently, the user sets a path to the storage apparatus 200 from the host systems 10, 20 via the physical switch 30, and places the path online.

Processing of the channel adapter 313 in the storage apparatus 100 or the storage apparatus 200 when the host system 10 or the host system 20 requests a device online after the foregoing setting is made is now explained. Incidentally, the following explanation is made on the assumption that the device to be placed online by the host system 10 is the control unit number A (CU #A) and the device number B (DEV #B).

Figure 27:
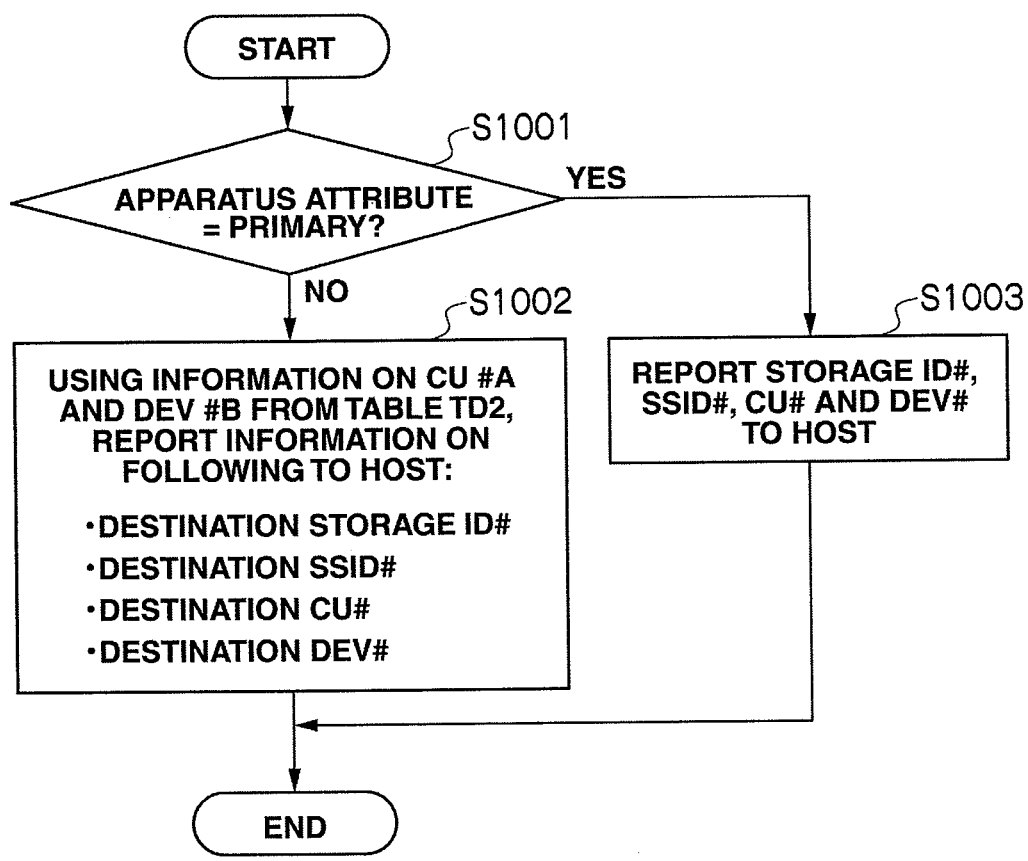
FIG. 27 is a flowchart showing the processing during IO control according to the present invention.

FIG. 27 is a flowchart showing the processing of the channel adapter 313 to be executed when the device online is requested. The channel adapter 313 determines whether the apparatus attribute is "primary" based on the table TF (S1001), and, if the apparatus attribute is not "primary" (S1001: NO), it uses information on the control unit number A and the device number B from the table TD2 to report information on the destination storage ID number, the destination subsystem ID number, the destination control unit number and the destination device number to the host system 10 (S1002). If the apparatus attribute is "primary" (S1001: YES), the channel adapter 313 reports information on the storage ID number, the subsystem number, the control unit number and the device number to the host system 10 (S1003).

As a result of performing this processing, the channel adapter 313 performs processing to report information on the storage ID number, the subsystem number, the control unit number and the device number to the host system 10 when the setting is a primary apparatus, and to report information on the destination storage ID number, the destination subsystem ID number, the destination control unit number and the destination device number of the destination to the host system 10 when the setting is a secondary apparatus.

Figure 28:
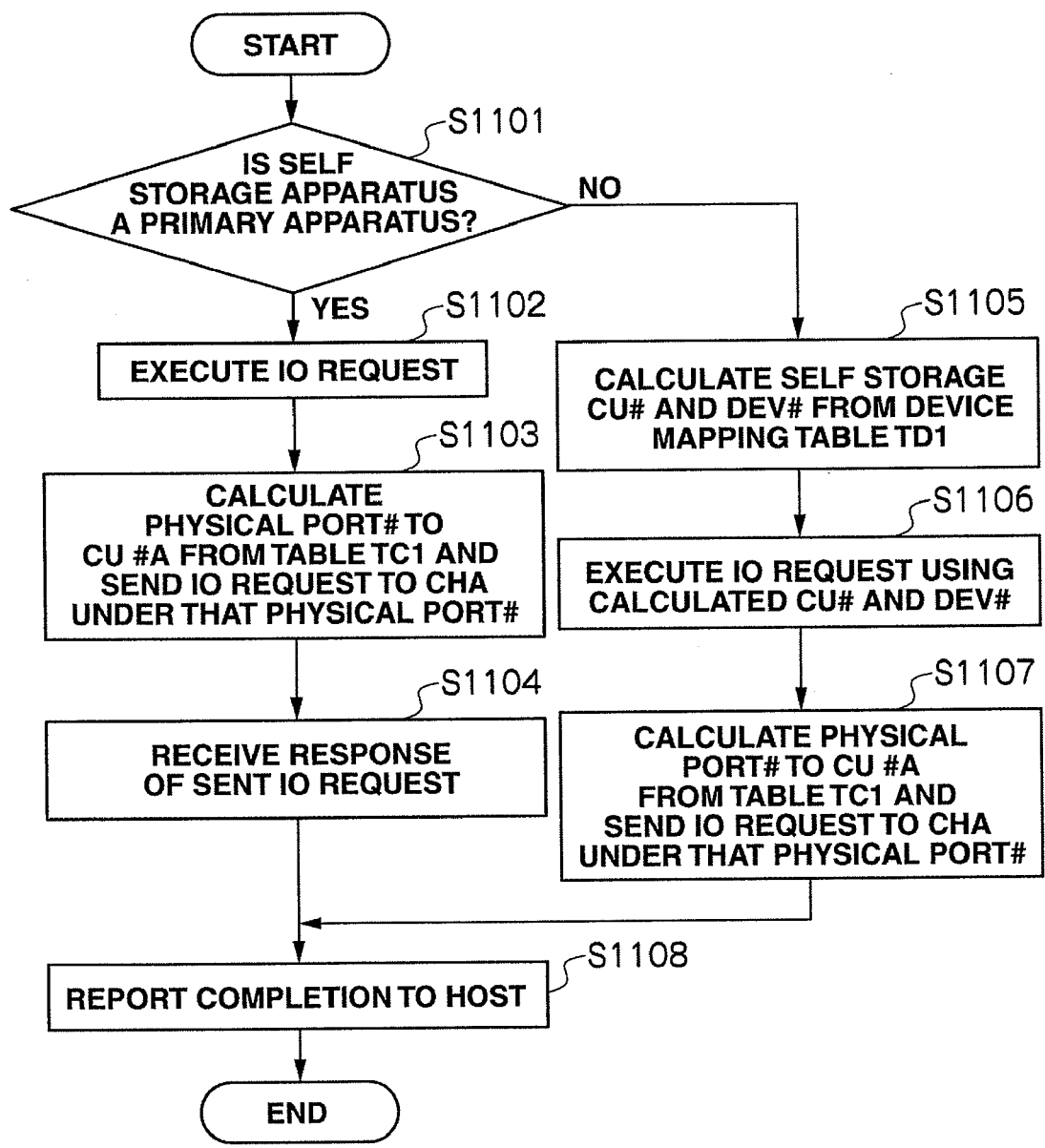
FIG. 28 is a flowchart showing the processing during IO control according to the present invention.

Processing of the channel adapter 313 under the port 111 (port #A) is now explained. FIG. 28 is a flowchart showing the processing of the channel adapter 313 under the port 111. The channel adapter 313 determines whether the self storage apparatus is a primary apparatus (S1101), and, when it is a primary apparatus (S1101: YES), the channel adapter 313 executes an IO request (S1102), calculates a physical port number (port 122 (#D)) to the control unit number A from the table TC1 and sends the IO request to the channel under the physical port (S1103), and receives a response of the sent IO request (S1104). Further, when the self storage apparatus is not a primary apparatus (S1101: NO), the channel adapter 313 calculates the control unit number and the device number of the self storage apparatus from the table TD1 (S1105), executes an IO request using the calculated control unit number and the device number (S1106), calculates the physical port number (port 122 (#D)) to the control unit number A from the table TC1, and sends the IO request to the channel adapter under the physical port (S1107). When the processing at step S1104 or step S1107 is finished, the channel adapter 313 reports the completion of such processing to the host system 10 (S1108).

Figure 29:
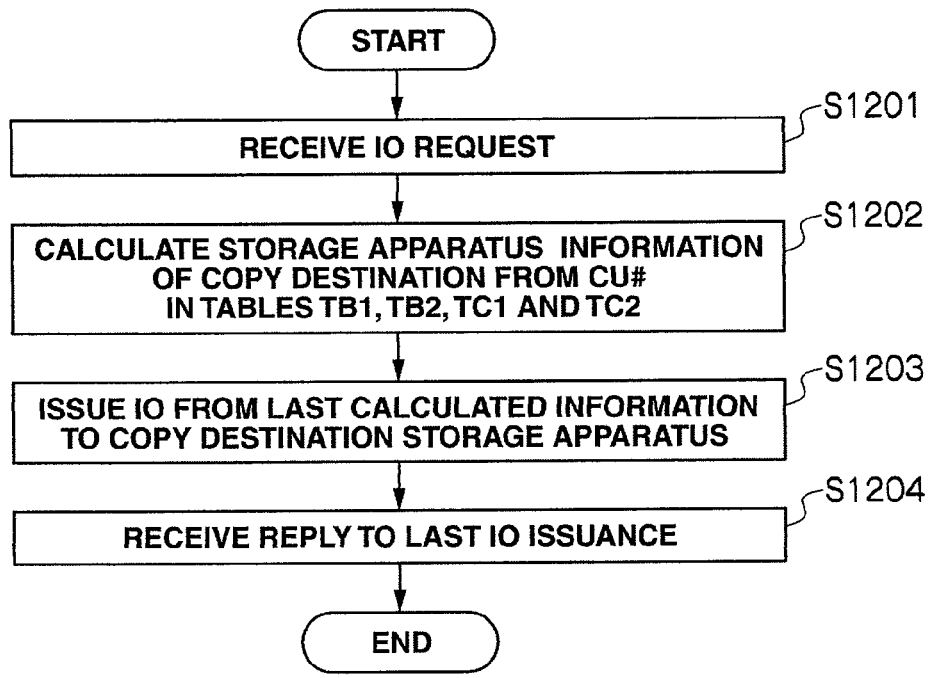
FIG. 29 is a flowchart showing the processing during IO control according to the present invention.

Processing of the channel adapter 313 under the port 122 (port #D) is now explained. FIG. 29 is a flowchart showing the processing of the channel adapter 313 under the port 122 (interactive initiator attribute port). Incidentally, the target port of the port 122 is set as the port 222 (port #H) as described above. When the channel adapter 313 receives an IO request (S1201), it calculates the storage apparatus information of the copy destination from the control unit number A based on the tables TB1, TB2, TC1 and TC2 (S1202), issues an IO to the copy destination storage apparatus based on the last calculated information (S1203), and receives a reply to the last IO issuance (S1204).

Figure 30:
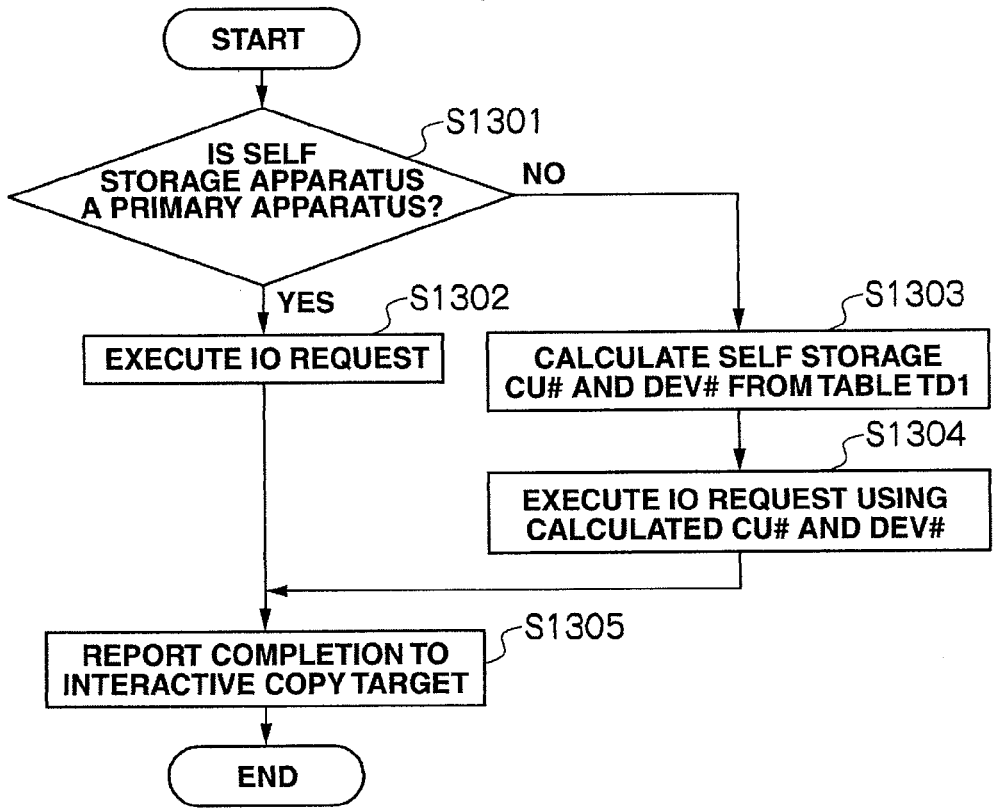
FIG. 30 is a flowchart showing the processing during IO control according to the present invention.

Processing of the channel adapter 313 under the port 222 (port #H: interactive target attribute port) is now explained. FIG. 30 is a flowchart showing the processing of the channel adapter 313 under the port 222. The channel adapter 313 determines whether the storage apparatus is a primary apparatus (S1301), and, if it is a primary apparatus (S1301: YES), the channel adapter 313 executes the IO request (S1302). If the storage apparatus is not a primary apparatus (S1301: NO), the channel adapter 313 calculates the control unit number and the device number of the self storage apparatus from the table TD1 (S1303), and executes the IO requests using the calculated control unit number and the device number (S1304). When the processing at step S1302 or step S1304 is finished, the channel adapter 313 reports the completion of such processing to the interactive copy target (port 122) (S1305).

As a result of executing the processing explained with reference to FIG. 27 to FIG. 30, IO control is enabled in the storage system 1, and the synchronous copy of data can be realized.

Processing to be executed when a failure such as a communication failure or a device failure occurs in the foregoing storage system 1 is now explained. As cases of failure occurrence, a case of a failure occurring in a path between the storage apparatus 100 and the storage apparatus 200 (failure occurrence case 1), a case of a failure occurring in a path from the host systems 10 and 20 to the storage apparatus 100 or the storage apparatus 200 (failure occurrence case 2), and a case of the device of the storage apparatus 100 or the storage apparatus 200 being blocked as a result of failure (failure occurrence case 3) are assumed, and each failure occurrence case is explained below. Incidentally, the detection of failure occurrence will be performed by the periodical check by the channel adapter 313.

(Failure Occurrence Case 1)

Figure 31:
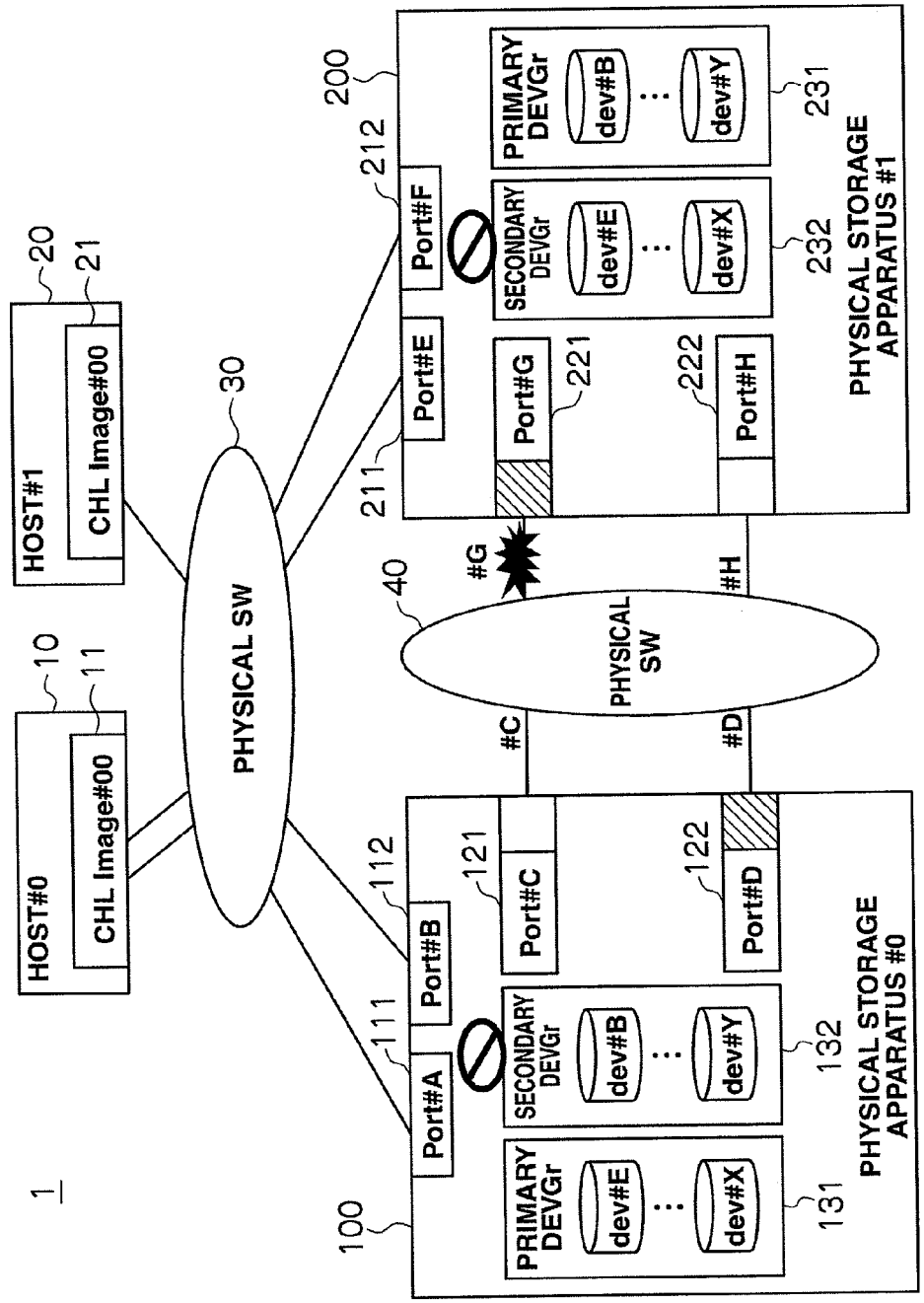
FIG. 31 is a diagram explaining failure occurrence case 1 according to the present invention.

FIG. 31 is a diagram explaining failure occurrence case 1. Since the configuration is substantially the same as the storage system 1 explained with reference to FIG. 1, the detailed explanation of the system is omitted, and the same reference numeral is given to the same component. The difference between FIG. 31 and FIG. 1 is that the control units 101, 102 and 103 are not shown, and that primary device groups (primary DEVgr) 131, 231 and secondary device groups (secondary DEVgr) 132, 232 are shown. Failure occurrence case 1 is a case when a failure occurs in the path between the storage apparatus 100 and the storage apparatus 200, and a case where a communication failure occurs in the port number G is explained.

In the storage system 1, when a communication failure occurs in the port number G as the last path and communication is disabled, access from the host systems 10, 20 to the secondary device groups 132, 232 will be prohibited. In other words, the host systems 10, 20 will only be able to access the primary device groups 131, 231. The host systems 10, 20 recognize that the devices (secondary device groups 132, 232) on a specified logical path are blocked. In FIG. 31, a report is issued to the host systems 10, 20 indicating that the device in relation to the storage apparatus 100 connected from the port 222 is normal. Incidentally, since the host systems 10, 20 are able to access the primary device groups 131, 232, load balancing is enabled even when one point of the port number G is subject to a failure.

Processing to be executed by the channel adapter 313 under the port subject to a failure in the case of failure occurrence case 1 is now explained. FIG. 34 is a flowchart showing this processing. When the channel adapter 313 in the storage apparatus 100 detects the occurrence of a failure; that is, when it detects a communication failure of the port number G (S1401), the channel adapter 313 suspends (copy suspend) the copy status in the table TD1 of the primary/secondary device groups 131 and 132 of the storage apparatus 100 (S1402), and blocks the device status in the table TD1 of the secondary device group 132 in the physical path between the host systems 10, 20 and the storage apparatuses 100, 200 as being abnormal (S1403). Incidentally, substantially the same processing is also performed by the channel adapter 313 in the storage apparatus 200.

The routine of failure recovery is now explained. Incidentally, FIG. 35 is a flowchart showing the failure recovery routine. The user eliminates factors of failure occurrence; that is, the user recovers the communication failure of the port number G. The user, for instance, operates each personal computer 303 connected to the storage apparatus 100 and the storage apparatus 200, and performs difference copy from the mutual primary device groups to the other secondary device groups. In other words, both storage apparatuses 100 and 200 receive a difference copy command (S1501). For example, when the storage apparatus 100 receives a difference copy command, the channel adapter 313 in the storage apparatus 100 performs the difference copy of data from the primary device group 131 to the secondary device group 232, and, when the storage apparatus 200 receives a difference copy command, the channel adapter 313 in the storage apparatus 200 performs the difference copy of data from the primary device group 231 to the secondary device group 132. Incidentally, in this embodiment, although the difference copy is started based on a command from the user, the difference copy may also be automatically started when each channel adapter 313 in the storage apparatus 100 and the storage apparatus 200 detects the recovery of a communication failure.

When the difference copy is complete, the copy status becomes "Duplex" (S1502). When the user operates the personal computer 303 with the copy status as "Duplex" and the user sends a logical path recovery command to the respective storage apparatuses 100 and 200, the channel adapter 313 acquires a logical path recovery command in relation to the host system (S1503). The storage apparatus 100 having a primary device group 131 reports the completion of difference copy to the storage apparatus 200, and the storage apparatus 200 having a secondary device group 232 sends a "device status change notification" to the host systems 10, 20. The "device status change notification" is a notification that shows that the status of the device has been changed from an abnormal status to a normal status. Further, the storage apparatus 200 having a primary device group 231 reports the completion of difference copy to the storage apparatus 100, and the storage apparatus 100 having the secondary device group 132 sends as "device status change notification" to the host systems 10, 20.

The host systems 10, 20 that receive this "device status change notification" acquire the status of the device of the storage apparatuses 100 and 200. When the storage apparatuses 100 and 200 send the "device status change notification" to the host systems 10, 20, they respectively set the status of the tables TD1, TD2 to "normal" and report to the host systems 10, 20. Therefore, the interactive copy of the storage apparatus 100 and the storage apparatus 200 is resumed. In other words, in the storage system 1, the same operation as the operation before the occurrence of a failure is resumed.

(Failure Occurrence Case 2)

Figure 32:
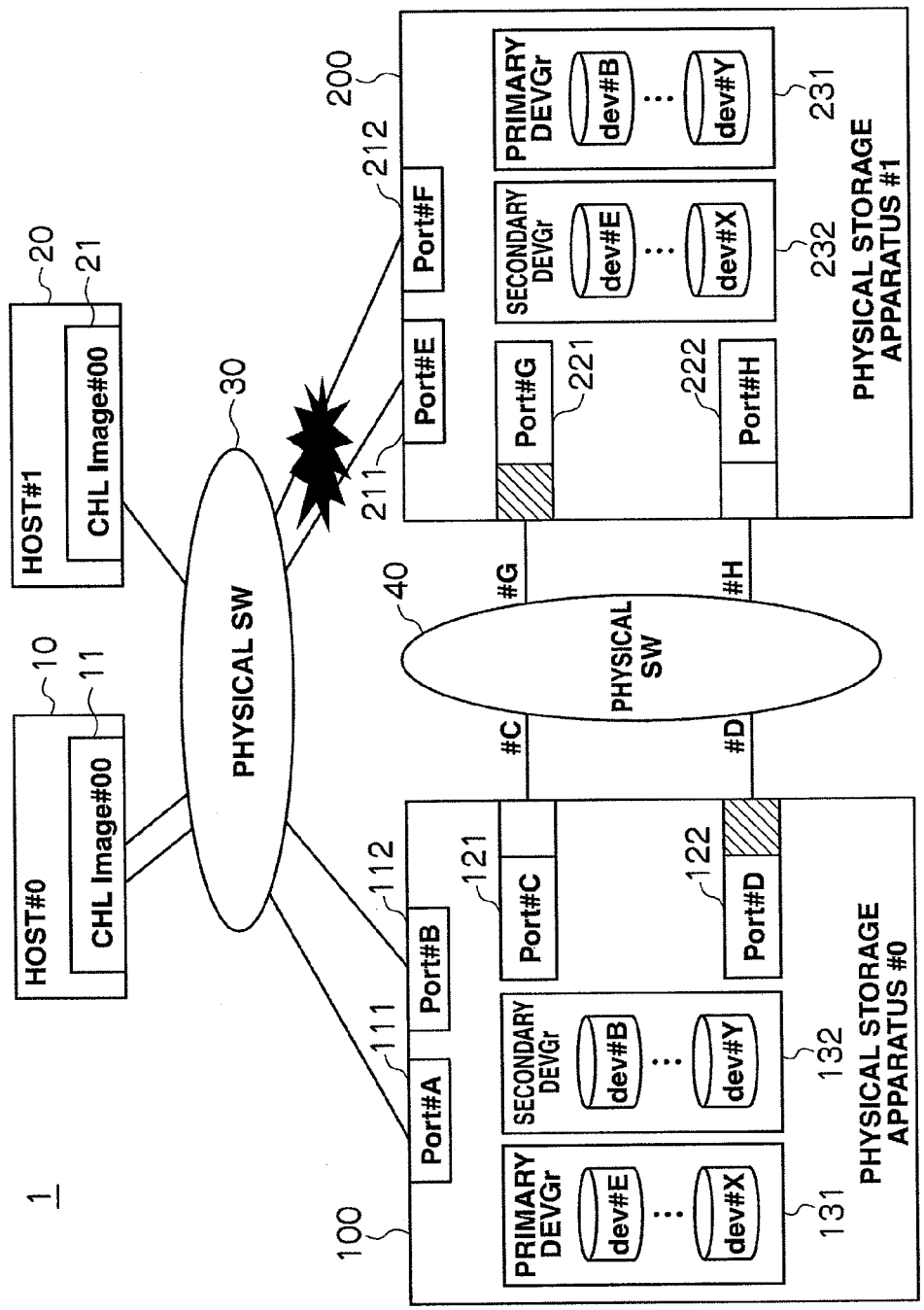
FIG. 32 is a diagram explaining failure occurrence case 2 according to the present invention.

FIG. 32 is a diagram explaining failure occurrence case 2. Since the configuration is substantially the same as the storage system 1 explained with reference to FIG. 1, the detailed explanation of the system is omitted, and the same reference numeral is given to the same component. The difference between FIG. 32 and FIG. 1 is that the control units 101, 102 and 103 are not shown, and that primary device groups (primary DEVgr) 131, 231 and secondary device groups (secondary DEVgr) 132, 232 are shown. Failure occurrence case 2 is a case when a failure occurs in the path between from the host systems 10, 20 to the storage apparatus 100 or the storage apparatus 200, and a case where a communication failure occurs between the physical switch 30 and the ports 211, 212 is explained.

When a communication failure occurs between the physical switch 30 and the ports 211, 212, communication between the host systems 10, 20 and the storage apparatus 200 will be disabled. Nevertheless, since communication between the host systems 10, 20 and the storage apparatus 100 is possible, no particular processing in the storage apparatuses 100, 200 is necessary. Therefore, when the user eliminates factors of the communication failure and operates the personal computer 303 connected to the storage apparatus 200 to send a logical path recovery command, in the storage system 1, the operation before the occurrence of a failure is resumed. Incidentally, S1504 in FIG. 36 shows the processing of the channel adapter 313 acquiring the logical path recovery command issued by the user.

Incidentally, as an enhanced feature of the storage system 1 in failure occurrence case 2, although the synchronous copy of data is usually performed between the storage apparatus 100 and the storage apparatus 200, since the path on the side of the storage apparatus 200 will be cut off during the occurrence of a failure, asynchronous copy may be performed. As the failure recovery routine in a case where the performance of asynchronous copy is set, the user operates the personal computer 303 to eliminate the factors causing the failure, and thereafter notifies the failure recovery to the storage apparatus 100. After the failure recovery is notified, the storage apparatus 100 starts the difference copy, and sends a difference copy completion notice to the storage apparatus 200 when the difference copy is finished. Upon receiving the difference copy completion notice, the storage apparatus 200 recovers the failed logical path. By configuring the storage system to perform recovery processing as described above, it is possible to perform asynchronous copy during the occurrence of a failure.

(Failure Occurrence Case 3)

Figure 33:
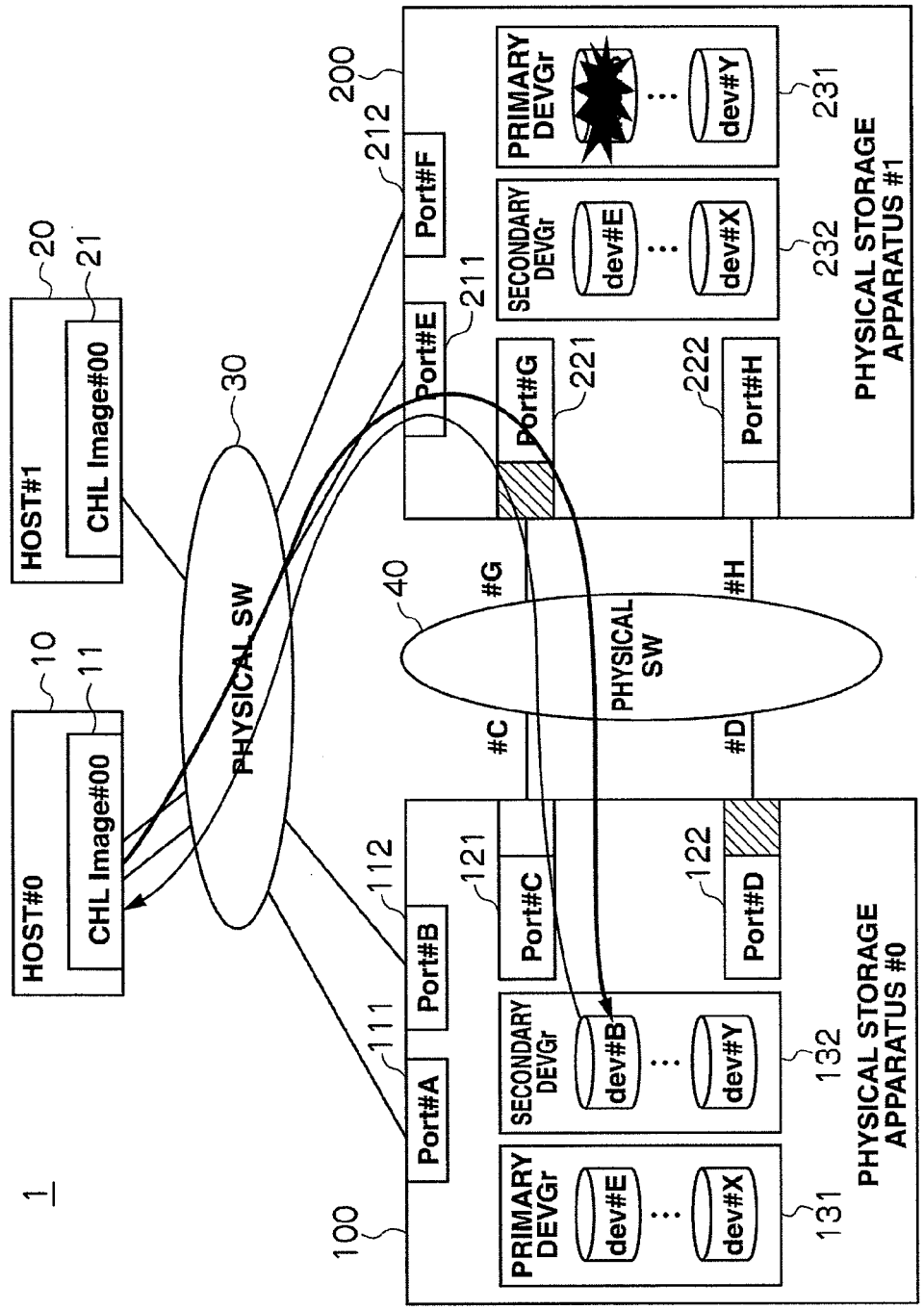
FIG. 33 is a diagram explaining failure occurrence case 3 according to the present invention.

FIG. 33 is a diagram explaining failure occurrence case 3. Since the configuration is substantially the same as the storage system 1 explained with reference to FIG. 1, the detailed explanation of the system is omitted, and the same reference numeral is given to the same component. The difference between FIG. 33 and FIG. 1 is that the control units 101, 102 and 103 are not shown, and that primary device groups (primary DEVgr) 131, 231 and secondary device groups (secondary DEVgr) 132, 232 are shown. Failure occurrence case 3 is a case when the device of the storage apparatus 100 or the storage apparatus 200 is blocked due to a failure, and a case where the device (dev #B) in the primary device group 231 of the storage apparatus 200 is blocked is explained.

When the device (dev #B) in the primary device group 231 of the storage apparatus 200 is blocked as described above, it is not possible to access the device (dev #B) in the storage apparatus 200. Thus, the channel adapter 313 of the storage apparatus 200 sends the command issued by the host systems 10, 20 directly to the storage apparatus 100.

Processing to be executed by the channel adapter 133 that controls the failed device in failure occurrence case 3 is now explained. FIG. 37 is a flowchart showing this processing. When the channel adapter 313 detects the occurrence of a failure in a device that it is controlling (S1601), the storage apparatus 200 having the failed device sends a "device blocked notice" to the storage apparatus 100 as the destination storage apparatus of such device (S1602). A "device blocked notice" is a notification to the effect that the dev #B in the primary device group 231 is blocked.

Then, the channel adapter 313 suspends the copy status in the table TD2 of the primary/secondary device groups 231 and 232 of the storage apparatus 200 (S1603), and blocks the device status in the table TD2 of the secondary device group 232 between the host systems 10, 20 and the storage apparatuses 100, 200 as being abnormal (S1604). Incidentally, substantially the same processing is also performed by the channel adapter of the storage apparatus 100 that received the device blocked notice.

After the user eliminates factors of the communication failure; that is, after the takes measures or the like for enabling communication with the blocked device, based on the user's operation of the personal computer 303 connected to the storage apparatus 200, the channel adapter 313 of the storage apparatus 200 changes the copy status corresponding to the device in the table DT2 to "Duplex" and changes the device status to "normal", and the channel adapter 313 of the storage apparatus 100 changes the copy status corresponding to the device in the table TD1 to "Duplex" and changes the device status to "normal". When the channel adapter 313 acquires a difference copy command in a state where the opponent's device status is "normal" based on the user's operation of the personal computer (S1701), the difference copy of data during the blocked period is performed.

When the difference copy during the period when the device (dev #B) was blocked is finished, in the storage system 1, the same operation as the operation before the occurrence of a failure is resumed.

According to this embodiment, it is possible to add the storage apparatus 200 without placing the storage apparatus 100 offline and duplicate data by configuring a pair with the primary device group 131 of the storage apparatus 100 and the secondary device group 232 of the storage apparatus 200, configuring a pair with the secondary device group 132 of the storage apparatus 100 and the primary device group 231 of the storage apparatus 200, and making the setting of the table TD2 to be the same as the setting of the table TD1 of the primary device group 131. Thereby, the host systems 10, 20 will recognize the primary device group 131 and the secondary device group 232 to be the same device, and the host systems 10, 20 will be able to access both the primary device group 131 and the secondary device group 232. Thus, it is possible to distribute the access from the host systems 10, 20 in order to improve the processing performance.

Further, the storage system 1 including the added storage apparatus 200 is able to continue its operation without the system operation being interrupted until failure recovery even in the occurrence of failures described in failure occurrence cases 1 to 3.

Incidentally, in the foregoing embodiment, the storage system 1 of the present invention duplicates data by including a host system 10, a storage apparatus 100 having a primary device group 131 and a secondary device group 132 to be connected to the host system 10, and a storage apparatus 200 having a primary device group 241 and a secondary device group 242, and connecting the storage apparatus 200 to the host system 10 and the storage apparatus 100, configuring a first pair with the primary device group 131 and the secondary device group 242, and configuring a second pair with the primary device group 241 and the secondary device group 132.

In the storage system 1, the storage apparatus 100 comprises a table TD1 for storing first mapping information which associates the control unit number and device number that specifies the respective volumes in the primary device group 131 and the storage apparatus number, control unit number and device number that specifies the respective devices in the secondary device group 242, and a channel adapter 313 that writes first data in a relevant primary device upon receiving from the host system 10 a command for writing the first data in any one of the devices in the primary device group 131, sends to the storage apparatus 200 a first command for writing first data in a secondary device corresponding to the primary device to be written with the first data specified using the first mapping information, writes second data in a relevant secondary volume upon receiving from the host system 10 a command for writing the second data in a secondary volume in the secondary volume group 132, and sends to the storage apparatus 200 a second command for writing second data in a primary volume corresponding to the secondary volume to be written with the second data specified using the first mapping information.

Further, in the storage system 1, the storage apparatus 200 comprises a table TD2 for storing second mapping information associated with the same contents as the first mapping information, and a channel adapter 313 that writes third data in a relevant primary volume upon receiving from the host system 10 a command for writing the third data in any one of the primary volumes in the primary volume group 231, sends to the storage apparatus 200 a third command for writing third data in a secondary volume corresponding to the primary volume to be written with the third data specified using the second mapping information, writes fourth data in a relevant secondary volume upon receiving from the host system 10 a command for writing the fourth data in a secondary volume in the secondary volume group 232, and sends to the storage apparatus 100 a fourth command for writing fourth data in a primary volume corresponding to the secondary volume to be written with the fourth data specified using the second mapping information.

As the result of the storage system 1 adopting the foregoing configuration, the channel adapter 313 of the storage apparatus 200 writes data in a secondary volume corresponding to the primary volume to be written with data based on a second command upon receiving such second command from the storage apparatus 100, and the channel adapter 313 of the storage apparatus 100 writes data in a secondary volume corresponding to the primary volume to be written with data based on a fourth command upon receiving such fourth command from the storage apparatus 200. Nevertheless, the present invention is not limited thereto, and can be applied to various storage apparatuses.

Incidentally, the first mapping information, as shown in the table TD1, includes information showing whether the device group is a primary device group or a secondary device group, information showing the device status regarding whether the device is of a normal status, and information showing the copy status regarding whether the device is of a copy status.

Further, the second mapping information, as shown in the table TD2, includes information showing whether the device group is a primary device group or a secondary device group, information showing the device status regarding whether the device is of a normal status, and information showing the copy status regarding whether the device is of a copy status.

A modified example of the storage system 1 is now explained. FIG. 39 is a diagram showing the configuration of a storage system 2, which is a modified example of the storage system 1. The storage system 2 is configured by additionally connecting a storage apparatus 500, which is set as a primary apparatus, to the storage apparatus 200 set as a secondary apparatus. A primary device group 141 in the storage apparatus 100 and a secondary device group 241 in the storage apparatus 200 configure a pair, and a primary device group 541 in the storage apparatus 500 and a secondary device group 242 in the storage apparatus 200 configure a pair.

Specifically, the storage system 2 includes a host system 10, a storage apparatus 100 having a primary device group 141 to be connected to the host system 10, a storage apparatus 200 having a secondary device group 241 and a secondary device group 242, a host system 50, and a storage apparatus 500 having a primary device group 541 to be connected to the host system 50, and duplicates data by connecting the storage apparatus 200 to the host system 10, the storage apparatus 100, the host system 50 and the storage apparatus 500, configuring a pair with the primary device group 141 of the storage apparatus 100 and the secondary device group 241 of the storage apparatus 200, and configuring a pair with the primary device group 541 of the storage apparatus 500 and the secondary device group 242 of the storage apparatus 200.

The storage apparatus 100 comprises a table TDA for storing first mapping information which associates the control unit number and device number that specify the respective primary volumes in the primary volume group 141 and the storage apparatus number, control unit number and device number that specify the respective secondary volumes in the secondary volume group 241, and a channel adapter 313A that write first data in a relevant primary volume upon receiving from the host system 10 a command for writing the first data in any one of the primary volumes in the primary volume group 141, and sends to the storage apparatus 200 a first command for writing first data in a secondary volume corresponding to the primary volume to be written with the first data specified using the first mapping information.

Further, the storage apparatus 500 comprises a table TDC for storing second mapping information which associates the control unit number and device number that specify the respective primary volumes in the primary volume group 541 and the storage apparatus number, control unit number and device number that specify the respective volumes in the secondary volume group 242, and a channel adapter 313 that writes second data in a relevant primary volume upon receiving from the host system 50 a command for writing the second data in any one of the primary volumes in the primary volume group 541, and sends to the storage apparatus 200 a second command for writing second data in a secondary volume corresponding to a primary volume to be written with the second data specified using the second mapping information.

Further, the storage apparatus 200 comprises a table TDB1 for storing third mapping information associated with the same contents as the first mapping information, a table TDB2 for storing fourth mapping information associated with the same contents as the second mapping information, and a channel adapter 313 that writes third data in a relevant secondary volume upon receiving from the host system 10 a command for writing the third data in any one of the secondary volumes in the secondary volume group 241, and sends to the storage apparatus 100 a third command for writing third data in a primary volume corresponding to the secondary volume to be written with the third data specified using the third mapping information, and writes fourth data in a relevant secondary volume upon receiving from the host system 50 a command for writing the fourth data in any one of the secondary volumes in the secondary volume group 242, and sends to the storage apparatus 500 a fourth command for writing fourth data in a primary volume corresponding to the secondary volume to be written with the fourth data specified using the fourth mapping information.

According to the storage system 2, it is possible to add the storage apparatus 200 without going offline, and duplicate data between the storage apparatus 100 and the storage apparatus 200, and data between the storage apparatus 500 and the storage apparatus 200. Further, according to the storage system 2, primary/secondary device group can be respectively configured by adding just one storage apparatus 200 without having to respectively add a secondary apparatus to the storage apparatus 100 and the storage apparatus 500 as the primary apparatuses. Therefore, even in cases where the storage apparatus 100 and the storage apparatus 500 are completely different systems, it is possible to perform the synchronous copy of data to be written in the primary device groups 141, 541 simply by adding the storage apparatus 200.

Incidentally, in the foregoing embodiments, although cases were explained for applying the present invention to the storage system 1 configured as illustrated in FIG. 1 and to the storage system 2 configured as illustrated in FIG. 39, the present invention is not limited thereto, and can be broadly applied to various storage systems having other configurations.

As another modified example of the foregoing embodiments, the storage system may also be configured as described below. This storage system includes a host system 10, a storage apparatus 100 having a primary volume group 131 to be connected to the host system 10, and a storage apparatus 200 having a secondary volume group 232, and connects the storage apparatus 200 to the host system 10 and the storage apparatus 100, and configures a pair with the primary volume group and the secondary volume group. Incidentally, the reference numerals are the same as those used in the explanation with reference to FIG. 1, and the same components are given the same reference numeral in the following explanation.

The storage apparatus 100 comprises a table TD1 for storing first mapping information which associates the control unit number and device number that specify the respective primary volumes in the primary volume group 131, and the storage apparatus number, control unit number and device number that specify the respective secondary volumes in the secondary volume group 232, and a channel adapter 313 that writes first data in a relevant primary volume upon receiving from the host system 10 a command for writing the first data in any one of the primary volumes in the primary volume group 131, and sends to the storage apparatus 200 a first command for writing first data in a secondary volume corresponding to the primary volume to be written with the first data specified using the first mapping information.

Further, the storage apparatus 200 comprises a table TD2 for storing second mapping information associated with the same contents as the first mapping information, and a channel adapter 313 that writes second data in a relevant secondary volume upon receiving from the host system 10 a command for writing the second data in any one of the secondary volumes in the secondary volume group 232, sends to the storage apparatus 100 a second command for writing second data in a primary volume corresponding to the secondary volume to be written with the second data specified using the second mapping information.

The storage system adopting the foregoing configuration is also able to add a storage apparatus without going offline and duplicate data by issuing a command to the storage apparatuses 100 and 200 to store the mapping information of the table TD1 in the table TD2 using the personal computer 303 connected to the storage apparatuses 100, 200.

The present invention can be broadly applied to various storage systems.

We claim:

1. A storage system including a host system, a first storage apparatus having a primary volume group to be connected to said host system, and a second storage apparatus having a secondary volume group, and which duplicates data by connecting said second storage apparatus to said host system and said first storage apparatus, and configuring a pair with said primary volume group and said secondary volume group,
   wherein said first storage apparatus comprises:
     a first mapping table for storing first mapping information which associates first information that specifies the respective primary volumes in said primary volume group and second information that specifies the respective secondary volumes in said secondary volume group; and
     a first control unit for writing first data in a relevant primary volume upon receiving from said host system a command for writing said first data in any one of the primary volumes in said primary volume group, and sending to said second storage apparatus a first command for writing said first data in a secondary volume corresponding to the primary volume to be written with said first data specified using said first mapping information; and
   wherein said second storage apparatus comprises:
     a second mapping table for storing second mapping information associated with the same contents as said first mapping information;
     a second control unit for writing second data in a relevant secondary volume upon receiving from said host system a command for writing said second data in any one of the secondary volumes in said secondary volume group, and sending to said first storage apparatus a second command for writing said second data in a primary volume corresponding to the secondary volume to be written with said second data specified using said second mapping information; and
     wherein said second storage apparatus comprises a table for storing information showing whether it is a primary apparatus or a secondary apparatus; and
     wherein said second control unit sends to said host system first information specifying a primary volume in said primary volume group specified with said second mapping information in substitute for second information that specifies the respective secondary volumes in said secondary volume group when a device online request is issued from said host system and information showing that it is a secondary apparatus has been set.

2. The storage system according to claim 1, wherein said first control unit writes said second data in a primary volume corresponding to a secondary volume written with said second data based on a second command upon receiving said second command from said second storage apparatus; and
   wherein said second control unit writes said first data in a secondary volume corresponding to a primary volume written with said first data based on a first command upon receiving said first command from said first storage apparatus.

3. A storage system including a host system, a first storage apparatus having a first primary volume group and a first secondary volume group to be connected to said host system, and a second storage apparatus having a second primary volume group and a second secondary volume group, and which duplicates data by connecting said second storage apparatus to said host system and said first storage apparatus, configuring a first pair with said first primary volume and said second secondary volume group, and configuring a second pair with said second primary volume group and said first secondary volume group;
   wherein said first storage apparatus comprises:
     a first mapping table for storing first mapping information which associates first information that specifies the respective primary volumes in said first primary volume group and second information that specifies the respective secondary volumes in said second secondary volume group; and
     a first control unit for writing first data in a relevant primary volume upon receiving from said host system a command for writing said first data in any one of the primary volumes in said first primary volume group, and sending to said second storage apparatus a first command for writing said first data in a secondary volume corresponding to the primary volume to be written with said first data specified using said first mapping information, and for writing second data in a relevant secondary volume upon receiving from said host system a command for writing said second data in a secondary volume in said first secondary volume group, and sending to said second storage apparatus a second command for writing said second data in a primary volume corresponding to the secondary volume to be written with said second data specified using said first mapping information; and
   wherein said second storage apparatus comprises:
     a second mapping table for storing second mapping information associated with the same contents as said first mapping information;
     a second control unit for writing third data in a relevant primary volume upon receiving from said host system a command for writing said third data in any one of the primary volumes in said second primary volume group, and sending to said first storage apparatus a third command for writing said third data in a second volume corresponding to the primary volume to be written with said third data specified using said second mapping information, and for writing fourth data in a relevant secondary volume upon receiving from said host system a command for writing said fourth data in a secondary volume in said second secondary volume group, and sending to said first storage apparatus a fourth command for writing said fourth data in a primary volume corresponding to the secondary volume to be written with said fourth data specified using said second mapping information; and
   wherein said second storage apparatus comprises a table for storing information showing whether it is a primary apparatus or a secondary apparatus, and
   wherein said second control unit sends to said host system first information specifying a primary volume in said primary volume group specified with said second mapping information in substitute for second information that specifies a secondary volume in said secondary volume group when a device online request is issued from said host system and information showing that it is a secondary apparatus has been set.

4. The storage system according to claim 3, wherein said second control unit writes said first data in a secondary volume corresponding to a primary volume written with said first data based on a first command upon receiving said first command from said first storage apparatus, and writes said second data in a primary volume corresponding to a secondary volume written with said second data based on a second command upon receiving said second command from said second storage apparatus; and wherein said first control unit writes said third data in a secondary volume corresponding to a primary volume written with said second data based on a third command upon receiving said third command from said second storage apparatus, and writes said fourth data in a primary volume corresponding to a secondary volume written with said fourth data based on a fourth command upon receiving said fourth command from said second storage apparatus.

5. A storage system including a host system, a first storage apparatus having a first primary volume group and a first secondary volume group to be connected to said host system, and a second storage apparatus having a second primary volume group and a second secondary volume group, and which duplicates data by connecting said second storage apparatus to said host system and said first storage apparatus, configuring a first pair with said first primary volume and said second secondary volume group, and configuring a second pair with said second primary volume group and said first secondary volume group;

wherein said first storage apparatus comprises:

a first mapping table for storing first mapping information which associates first information that specifies the respective primary volumes in said first primary volume group and second information that specifies the respective secondary volumes in said second secondary volume group; and a first control unit for writing first data in a relevant primary volume upon receiving from said host system a command for writing said first data in any one of the primary volumes in said first primary volume group, and sending to said second storage apparatus a first command for writing said first data in a secondary volume corresponding to the primary volume to be written with said first data specified using said first mapping information, and for writing second data in a relevant secondary volume upon receiving from said host system a command for writing said second data in a secondary volume in said first secondary volume group, and sending to said second storage apparatus a second command for writing said second data in a primary volume corresponding to the secondary volume to be written with said second data specified using said first mapping information; and wherein said second storage apparatus comprises:

a second mapping table for storing second mapping information associated with the same contents as said first mapping information;

a second control unit for writing third data in a relevant primary volume upon receiving from said host system a command for writing said third data in any one of the primary volumes in said second primary volume group, and sending to said first storage apparatus a third command for writing said third data in a second volume corresponding to the primary volume to be written with said third data specified using said second mapping information, and for writing fourth data in a relevant secondary volume upon receiving from said host system a command for writing said fourth data in a secondary volume in said second secondary volume group, and sending to said first storage apparatus a fourth command for writing said fourth data in a primary volume corresponding to the secondary volume to be written with said fourth data specified using said second mapping information; and wherein said first mapping information contains first volume group information showing whether it is a primary volume group or a secondary volume group;

wherein said second mapping information contains second volume group information showing whether it is a primary volume group or a secondary volume group;

wherein said first mapping information contains first status information showing a status on whether or not a volume is of a normal status;

wherein said second mapping information contains second status information showing a status on whether or not a volume is of a normal status;

wherein said first mapping information contains first copy status information showing a status on whether or not a volume is of a copy status;

wherein said second mapping information contains second copy status information showing a status on whether or not a volume is of a copy status; and wherein, when communication between said first storage apparatus and said second storage apparatus is interrupted, said first control unit changes said first copy status information to a copy suspend status, and changes said first status information corresponding to a volume in said first secondary volume group to an abnormal status; and said second control unit changes said second copy status information to a copy suspend status, and changes said second status information corresponding to a volume in said second secondary volume group to an abnormal status.

6. The storage system according to claim 5, wherein, when the interruption of communication between said first storage apparatus and said second storage apparatus is recovered, said first control unit performs difference copy of said first primary volume group and said second secondary volume group, and thereafter changes said first copy status information to a copy status, and changes said first status information corresponding to a volume in said first secondary volume group to a normal status; and said second control unit performs difference copy of said second primary volume group and said first secondary volume group, and thereafter changes said second copy status information to a copy status, and changes said second status information corresponding to a volume in said second secondary volume group to a normal status.

7. The storage apparatus according to claim 6, wherein a command for performing the difference copy of said first primary volume group and said second secondary volume group is acquired from a first information processing unit connected to said first storage apparatus, and a command for performing the difference copy of said second primary volume group and said first secondary volume group is acquired from a second information processing unit connected to said second storage apparatus.

8. A storage system including a host system, a first storage apparatus having a first primary volume group and a first secondary volume group to be connected to said host system, and a second storage apparatus having a second primary volume group and a second secondary volume group, and which duplicates data by connecting said second storage apparatus to said host system and said first storage apparatus, configuring a first pair with said first primary volume and said second secondary volume group, and configuring a second pair with said second primary volume group and said first secondary volume group;

wherein said first storage apparatus comprises:

a first mapping table for storing first mapping information which associates first information that specifies the respective primary volumes in said first primary volume group and second information that specifies the respective secondary volumes in said second secondary volume group; and a first control unit for writing first data in a relevant primary volume upon receiving from said host system a command for writing said first data in any one of the primary volumes in said first primary volume group, and sending to said second storage apparatus a first command for writing said first data in a secondary volume corresponding to the primary volume to be written with said first data specified using said first mapping information, and for writing second data in a relevant secondary volume upon receiving from said host system a command for writing said second data in a secondary volume in said first secondary volume group, and sending to said second storage apparatus a second command for writing said second data in a primary volume corresponding to the secondary volume to be written with said second data specified using said first mapping information; and wherein said second storage apparatus comprises:

a second mapping table for storing second mapping information associated with the same contents as said first mapping information;

a second control unit for writing third data in a relevant primary volume upon receiving from said host system a command for writing said third data in any one of the primary volumes in said second primary volume group, and sending to said first storage apparatus a third command for writing said third data in a second volume corresponding to the primary volume to be written with said third data specified using said second mapping information, and for writing fourth data in a relevant secondary volume upon receiving from said host system a command for writing said fourth data in a secondary volume in said second secondary volume group, and sending to said first storage apparatus a fourth command for writing said fourth data in a primary volume corresponding to the secondary volume to be written with said fourth data specified using said second mapping information; and wherein said first mapping information contains first volume group information showing whether it is a primary volume group or a secondary volume group;

wherein said second mapping information contains second volume group information showing whether it is a primary volume group or a secondary volume group;

wherein said first mapping information contains first status information showing a status on whether or not a volume is of a normal status;

wherein said second mapping information contains second status information showing a status on whether or not a volume is of a normal status;

wherein said first mapping information contains first copy status information showing a status on whether or not a volume is of a copy status;

wherein said second mapping information contains second copy status information showing a status on whether or not a volume is of a copy status;

wherein, when any one of the volumes in said second primary volume group or said second secondary volume group cannot be accessed, said second control unit notifies said first storage apparatus to the effect that said volume cannot be accessed, changes said second copy status information to a copy suspend status, and changes said second status information corresponding to a volume in a second secondary volume group to an abnormal status; and upon receiving said notification, said first control unit changes said first copy status information to a copy suspend status, and changes said first status information corresponding to a volume in said first secondary volume group to an abnormal status.

9. The storage system according to claim 8, wherein, when access to said inaccessible volume is permitted, said first control unit performs difference copy of said first primary volume group and said second secondary volume group; and said second control unit performs difference copy of said second primary volume group and said first secondary volume group.

10. The storage system according to claim 9, wherein a command for performing the difference copy of said first primary volume group and said second secondary volume group is acquired from a first information processing unit connected to said first storage apparatus, and a command for performing the difference copy of said second primary volume group and said first secondary volume group is acquired from a second information processing unit connected to said second storage apparatus.

11. A storage system including a first host system, a first storage apparatus having a first primary volume group to be connected to said first host system, a second storage apparatus having a first secondary volume group and a second secondary volume group, a second host system, and a second primary volume group to be connected to said second host system, and which duplicates respective data by connecting said second storage apparatus to said first host system, said first storage apparatus, said second host system and a third storage apparatus, configuring a pair with the first primary volume group of said first storage apparatus and said first secondary volume group, and configuring a pair with a second primary volume group of said third storage apparatus and said second secondary volume group, wherein said first storage apparatus comprises:

a first mapping table for storing first mapping information which associates first information that specifies the respective primary volumes in said first primary volume group and second information that specifies the respective secondary volumes in said first secondary volume group;

a first control unit for writing first data in a relevant primary volume upon receiving from said first host system a command for writing said first data in any one of the primary volumes in said first primary volume group, and sending to said second storage apparatus a first command for writing said first data in a secondary volume corresponding to the primary volume to be written with said first data specified using said first mapping information;

a second mapping table for storing second mapping information which associates third information that specifies the respective primary volumes in said second primary volume group and fourth information that specifies the respective volumes in said second secondary volume group; and a second control unit for writing second data in a relevant primary volume upon receiving from said second host system a command for writing said second data in any one of the primary volumes in said second primary volume group, and sending to said second storage apparatus a second command for writing said second data in a secondary volume corresponding to the primary volume to be written with said second data specified using said second mapping information;

wherein said second storage apparatus comprises:

a third mapping table for storing third mapping information associated with the same contents as said first mapping information;

a fourth mapping table for storing fourth mapping information associated with the same contents as said second mapping information; and a third control unit for writing third data in a relevant secondary volume upon receiving from said first host system a command for writing said third data in any one of the secondary volumes in said first secondary volume group, and sending to said first storage apparatus a third command for writing said third data in a primary volume corresponding to the secondary volume to be written with said third data specified using said third mapping information, and for writing fourth data in a relevant secondary volume upon receiving from said second host system a command for writing said fourth data in any one of the secondary volumes in said second secondary volume group, and sending to said third storage apparatus a fourth command for writing said fourth data in a primary volume corresponding to the secondary volume to be written with said fourth data specified using said fourth mapping information.

* * * * *